United States Patent [19]
Kawamoto et al.

[11] Patent Number: 5,772,146
[45] Date of Patent: Jun. 30, 1998

[54] REEL DEVICE FOR CABLE

[75] Inventors: Akio Kawamoto; Kiyoshi Watanabe; Yoshiaki Takano; Kazuhiro Kaneko, all of Fuji, Japan

[73] Assignee: Nihon Plast Co., Ltd., Fuji, Japan

[21] Appl. No.: 760,809

[22] Filed: Dec. 5, 1996

Related U.S. Application Data

[62] Division of Ser. No. 361,043, Dec. 21, 1994, abandoned.

[30] Foreign Application Priority Data

| Dec. 22, 1993 | [JP] | Japan | 5-324737 |
| Dec. 22, 1993 | [JP] | Japan | 5-324739 |
| Dec. 22, 1993 | [JP] | Japan | 5-324740 |
| Dec. 27, 1993 | [JP] | Japan | 5-333070 |
| May 26, 1994 | [JP] | Japan | 6-112544 |

[51] Int. Cl.$^6$ .......................... B65H 75/38; H01R 39/00; H01R 3/00
[52] U.S. Cl. ........................ 242/388; 242/388.6; 242/397; 439/15; 439/164
[58] Field of Search ............................. 242/397, 388.6, 242/388, 378, 378.4, 615.1, 615.2, 615.4, 397.2; 439/15, 164

[56] References Cited

U.S. PATENT DOCUMENTS

| 3,763,455 | 10/1973 | Confer et al. | 439/15 |
| 4,427,166 | 1/1984 | Aishi et al. | 242/615.4 X |
| 4,466,582 | 8/1984 | Shiba | 242/615.4 |
| 4,540,223 | 9/1985 | Schmerda et al. | 439/15 |
| 5,102,061 | 4/1992 | Suzuki et al. | 242/370 |
| 5,171,153 | 12/1992 | Kubota et al. | 439/15 |
| 5,219,460 | 6/1993 | Kato et al. | 439/164 |
| 5,224,871 | 7/1993 | Ida et al. | 439/164 |
| 5,409,389 | 4/1995 | Shibata et al. | 439/15 X |

FOREIGN PATENT DOCUMENTS

| 5-56543 | 3/1993 | Japan . |
| 5-207632 | 8/1993 | Japan . |

Primary Examiner—John Q. Nguyen
Attorney, Agent, or Firm—Foley & Lardner

[57] ABSTRACT

A reel device for a flat cable through which electrical component parts mounted on a steering wheel are electrically connected with electrical component parts on a vehicle body side. The reel device is disposed between the steering wheel and a combination switch mounted on the vehicle body side and comprises a generally cylindrical frame section inside which a shaft section is disposed rotatable relative to the frame section. The frame section is fixed to the combination switch, whereas the shaft section is fixedly mounted around the steering shaft. The flat cable is movably disposed in an annular cable storing space formed between the frame section and the shaft section. A generally annular guide member is movably disposed in the cable storing space and located between the cable wound on the outer peripheral surface of the shaft section and the cable wound on the inner peripheral surface of the frame section. The guide member is formed with a slit through which the flat cable extending between inside and outside of the guide member is passed upon being turned over. At least one linear projections are formed on at least the inner peripheral surface of the guide member so as to be slidably contactable with the cable thereby to reduce a frictional resistance of the flat cable to the guide member.

15 Claims, 21 Drawing Sheets

REEL DEVICE FOR CABLE

This application is a divisional of application Ser. No. 08/361,043, filed Dec. 21, 1994, abandoned.

BACKGROUND OF THE INVENTION

1. Field of the Invention

This invention relates to improvements in a reel device for a cable, used to connect members which make a relative rotation, and more particularly to arrangements for smoothening the movement of the cable in the reel device thereby to accomplish a stable rotational operation of the reel device.

2. Description of the Prior Art

Hitherto, a variety of cable reel devices for connecting members which make a relative rotation have been proposed and put into practical use. A typical one of them is disclosed, for example, in Japanese Patent Provisional Publication No. 5-56543. This cable reel device is arranged such that electrical component parts disposed at the vehicle body side of an automotive vehicle and electrical component parts disposed at the side of a steering wheel rotatable in right and reverse directions are electrically connected through a so-called flat cable which is formed by arranging a plurality conductor wires and by covering the wires with a plastic film. This flat cable is stored inside a hollow and annular casing body fitted to a steering shaft. The casing body is formed by combining a cylindrical frame body fixed to a member on the vehicle body side and a cylindrical shaft body disposed inside the frame body and rotatable with the steering wheel, in a manner to make a relative rotation therebetween. The flat cable is stored in a space formed between the frame body and the shaft body under a condition that one end section thereof is fixed to the frame body while the other end section thereof is fixed to the shaft body. Additionally, a generally ring-shaped guide body is stored in the space and formed at a part thereof with a turning-over insertion section through which the flat cable is inserted to be movably disposed around the shaft body.

With this cable reel device, in a condition that the steering wheel is operated to rotate in one direction, the flat cable is drawn inside the guide body through the turning-over insertion section of the guide body while being turned over in the U-shape, and wound on the outer peripheral surface of the shaft body. In a condition that the steering wheel is operated to rotate in a reverse direction, the unwound flat cable passes through the turning-over insertion section and pushed out of the guide body while being turned over in the U-shape, and wound on the inner peripheral surface of the frame member. This cable reel device can reduce the length of the flat cable as compared with the case of a so-called clock-spring type cable reel device in which the flat cable is unwound or wound, maintaining a condition the flat cable is wound only in one direction on the shaft body. Furthermore, in this cable reel device, a belt-shaped sliding sheet is disposed along the peripheral surface of the flat cable. This reduces a frictional resistance developed between the flat cable and a guide body or the like, thereby smoothly accomplishing the winding operation of the flat cable onto the outer peripheral surface of the shaft body and onto the inner peripheral surface of the frame body.

However, the above-mentioned conventional arrangement unavoidably requires to use the sliding sheet along the flat cable having a large length dimension. The sliding sheet is rolled under the state in which two sheets are laid one upon another, and therefore a large space is necessary as the cable storing space thereby enlarging the diameter of the frame body. Furthermore, use of the sliding sheet requires troublesome operations in assembly of the cable reel device while raising material cost and production cost.

SUMMARY OF THE INVENTION

It is an object of the present invention to provide an improved reel device for a cable, which can smoothly operate without using a sliding sheet while lowering a production cost thereof.

Another object of the present invention is to provide an improved reel device for a cable, which can make a stable rotational relative movement between a frame section and a shaft section of a casing while preventing the cable from being disordered in winding.

A further object of the present invention is to provide an improved reel device for a cable, in which the cable can be allowed to smoothly move while smoothly passing through a turning-over insertion section (slit) of the guide member.

A still further object of the present invention is to provide an improved reel device for a cable, in which the guide member is prevented from becoming axially rickety thereby to avoid generation of foreign noise while promoting a smooth operation of the reel device.

A reel device for a cable, of the present invention comprises a casing including a generally cylindrical frame section, and a shaft section disposed rotatable in first and second directions relative to the frame section. The first and second directions are opposite to each other. A cable storing space is formed between the frame section and the shaft section. The cable is stored in the cable storing space and has a first end section connected to the frame section, and a second end section connected to the shaft section. The cable is wound on an outer peripheral surface of the shaft section in a third direction and on an inner peripheral surface of the frame section in a fourth direction with a relative rotation between the frame section and the shaft section. The third and fourth directions are opposite to each other. A guide member is disposed in the cable storing space and located between the cable wound on the outer peripheral surface of the shaft section and the cable wound on the inner peripheral surface of the frame section so as to guide the cable. The guide member is generally annular and disposed around the shaft section to be rotatable in a peripheral direction of the casing. The guide member is formed with a slit through which the cable passes and is turned over. Additionally, the guide member is constructed and arranged to smoothen a movement of the cable through the slit and a rotational movement of the guide member.

The thus arranged cable reel device of the present invention is used to be disposed between members which make a relative rotational movement in right and reverse directions, and configured such that the frame section and the shaft section are respectively connected with the members. Thus, these members are electrically connected with each other with a cable stored in the cable storing space between the frame section and the shaft section, in which electric power or signals are transmitted through this cable. Furthermore, in case that the shaft section is rotated in one direction relative to the frame section, the cable passes through a turning-over insertion section (slit) of the guide member and is drawn inside the guide member while being turned over in the U-shape, and wound on the outer peripheral surface of the shaft section. In case that the shaft section is rotated in the reverse direction, the cable passes through the turning-over insertion section (slit) of the guide member while being unwound from the shaft section and while being turned over in the U-shape, and drawn out of the guide member to be wound on the inner peripheral surface of the frame section. When the cable has been unwound from the shaft section, the cable can be allowed to smoothly move while smoothly passing through a turning-over insertion section (slit) of the guide member, in which a frictional resistance between the guide member and the cable is reduced so that the cable can be pushed out smoothly through the turning-over insertion section of the guide member. This can make a stable and smooth relative rotational movement between the frame section and the shaft section of the casing while preventing the cable from being disordered in winding. It is to be noted that the stable and smooth relative rotation between the frame section and the shaft section can be done to obtain a stable operation of the cable reel device without using a sliding sheet between the cable and members contactable with the cable, thereby simplifying the structure of the cable reel device.

BRIEF DESCRIPTION OF THE DRAWINGS

In the drawings, like reference numerals designate like parts and elements throughout all figures, in which.

DETAILED DESCRIPTION OF THE INVENTION

Figure 1:
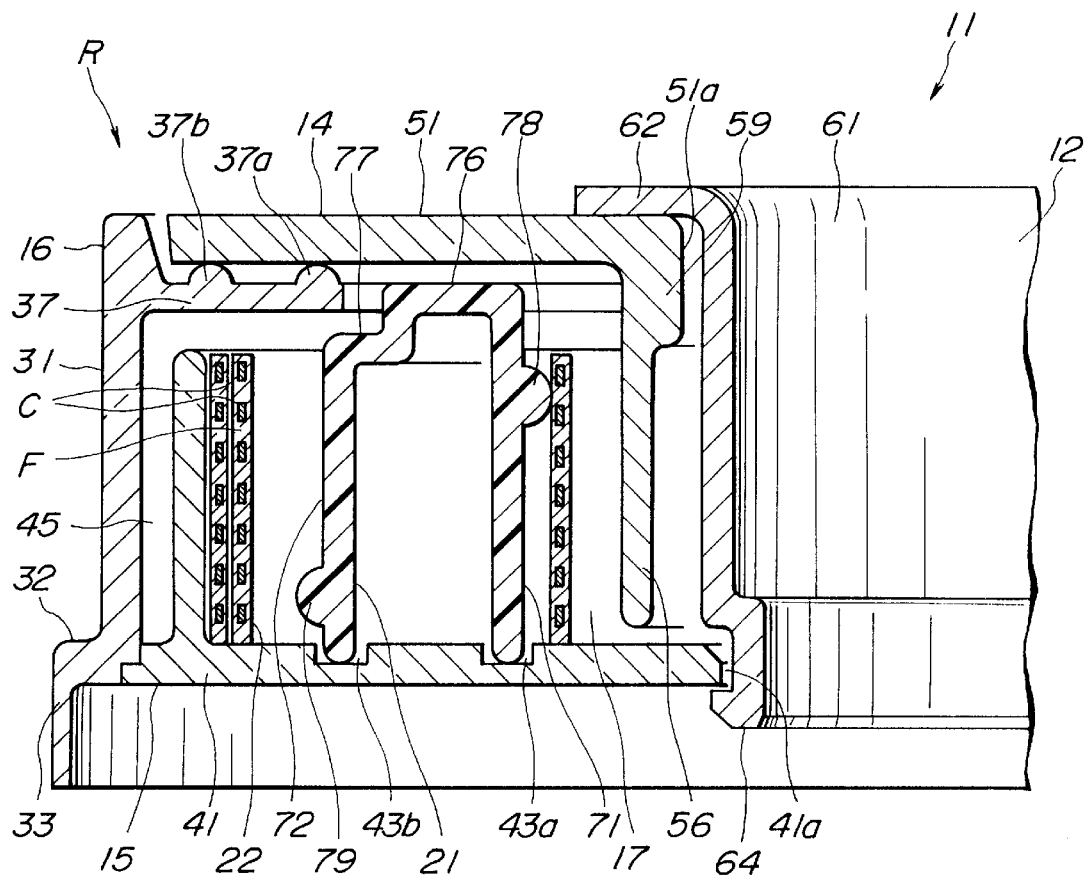
FIG. 1 is a fragmentary vertical sectional view of an essential part of a first embodiment of a reel device for a cable, according to the present invention.

Referring now to FIGS. 1 to 6 of the drawings, a first preferred embodiment of a reel device for a cable, according to the present invention is illustrated by the reference character R. The cable reel device R of this embodiment is for an automotive vehicle and comprises a casing 11 which is formed in the generally hollow annular shape by assembling a grapple member 12, a rotor 14, a stator 15, an outer case 16 and the like each of which is fabricated as a one-piece structure and formed of a plastic such as a polyacetal copolymer. The casing 11 is formed thereinside with an annular cable storing section or space 17 in which an annular guide member 21 and a flat cable 22 as a cable are stored. This cable reel device R is, for example, mounted on the vehicle and located between a steering wheel (not shown) and a so-called combination switch (not shown) under a condition to be fitted around a steering shaft (not shown). The steering wheel is mounted on the upper end section of the steering shaft and arranged to rotate with the steering shaft. The combination switch is fitted to a steering column disposed around the steering shaft and installed to a vehicle body side. Through the flat cable 22 of this cable reel device R, electrical component parts such as an airbag system mounted on the steering wheel, a horn switch, an operation switch for an automatic speed control device (ASCD) or cruise control device, and an operation switch for a sound or audio system located at the steering wheel are electrically connected to electrical component parts such as a battery, an impact sensor, a horn device and the automatic speed control device, and the sound system. The steering shaft forms part of a steering gear and mechanically connected to a steering linkage (not shown) so that it can be operated to make its 2 or 2.5 rotations in each of right and left directions from a neutral position in accordance with a gear ratio or the like of a gear unit (not shown) of the steering gear. In other words, the steering shaft can be operated to make its 4 or 5 rotations in maximum in a so-called lock to lock course defined between a lock position in one rotational direction to another lock position in the opposite rotational direction.

The flat cable 22 is formed by parallel arranging a plurality (two or nine) of conductor wires C and by covering them with a plastic film F to constitute a one-piece structure. The flat cable 22 is formed belt-shaped and flexible, and has a slight elasticity. The flat cable 22 is provided with alternation sections 22a formed of a plastic which sections are located near the opposite end sections of the flat cable 22. Connectors (not shown) are connected respectively to the opposite end sections of this flat cable 22, and respectively fitted to corresponding opposite connectors (not shown) disposed at the steering wheel and the combination switch.

As shown in FIGS. 1 to 4, the outer case 16 has an outer cylindrical section 31 which is generally cylindrical and provided at its lower end portion with a vehicle body side installation section 32 which is in the generally trapezoid shape in plan and projects radially outwardly. This vehicle body side installation section 32 is provided at its outer peripheral section with an installation piece section 33 which projects downwardly. The installation piece section 33 is formed at its four corner portions with installation holes 34 through which the outer case 16 is fixed to the combination switch. The vehicle body side installation section 32 is formed at its lower surface side with a plurality of stator fixing sections 35. Each stator fixing section 35 includes a groove section 35a which is formed to extend upwardly, and a caulk pin 35b projecting from the groove section 35a. Additionally, the outer cylindrical section 31 is formed at its one side portion with a cable drawing-out section 36 which projects laterally and opens downwardly. Further, an annular guide member supporting section 37 is projected radially inwardly from the vicinity of the upper end section of the outer cylindrical section 31. Generally annular two linear projections 37a, 37b are formed on the upper surface of the guide member supporting section 37 to project from the upper surface.

Figure 2:
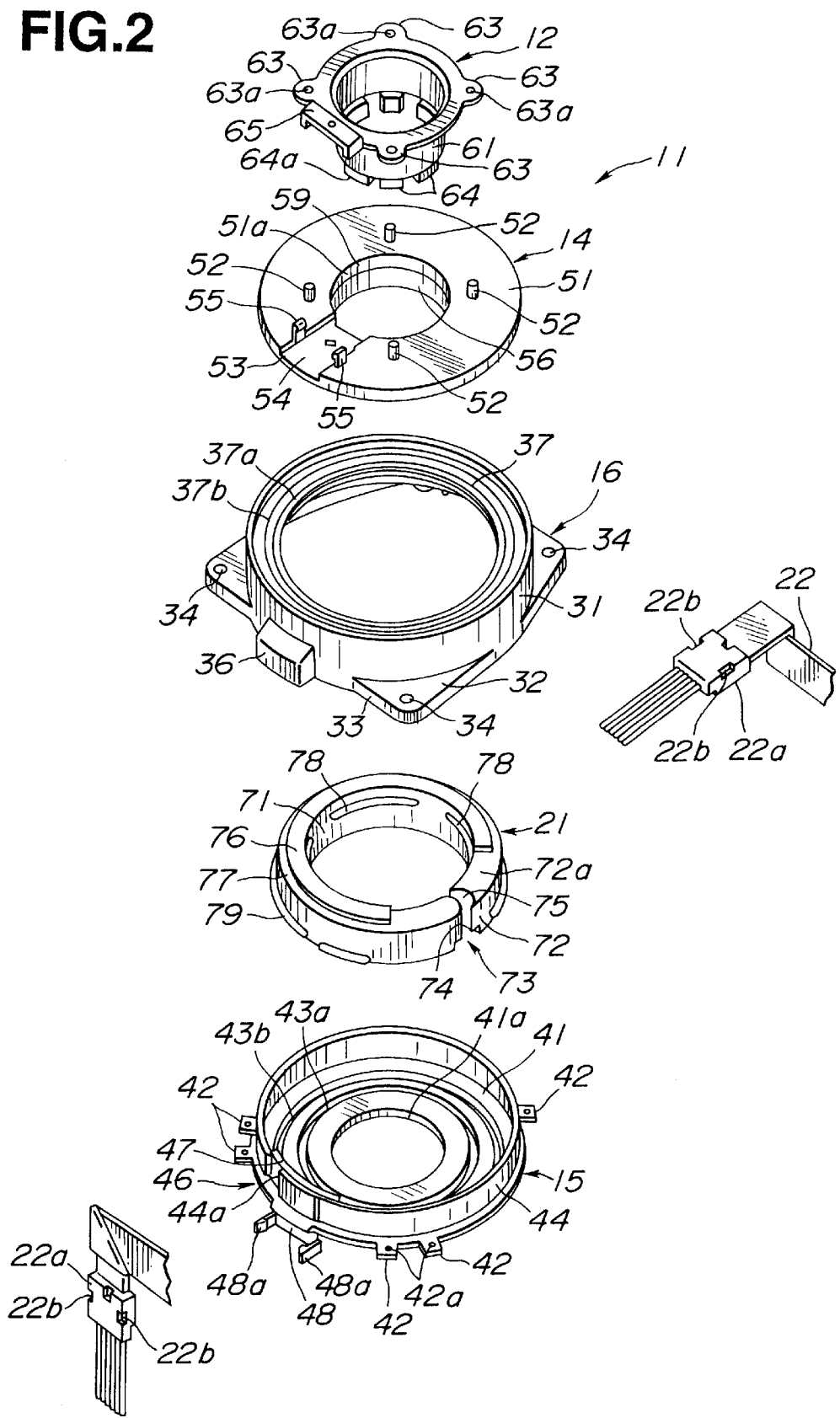
FIG. 2 is an exploded perspective view of the cable reel device of FIG. 1.
Figure 3:
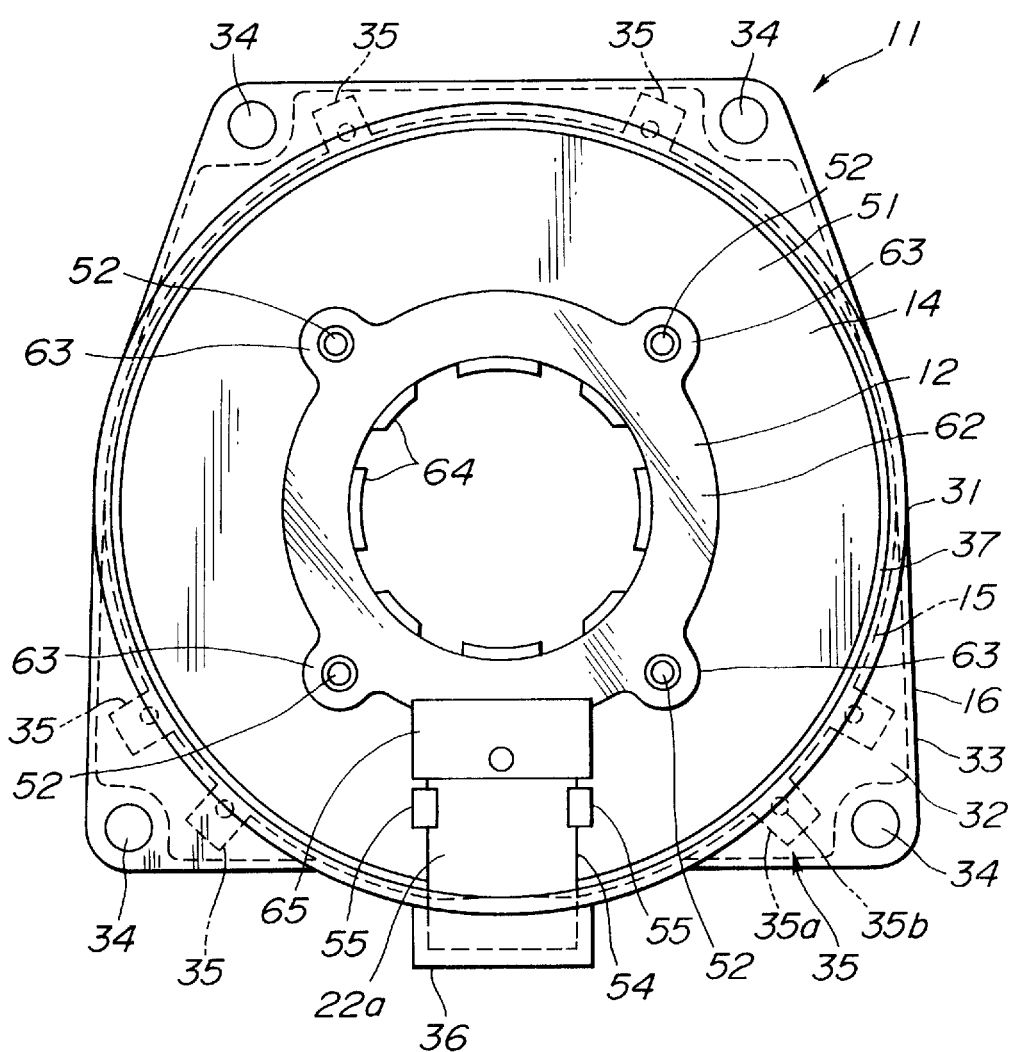
FIG. 3 is a top plan view of the cable reel device of FIG. 1.
Figure 4:
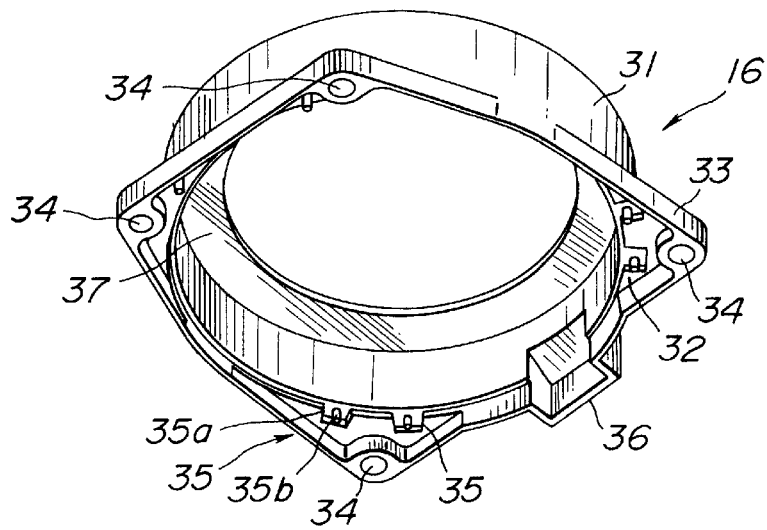
FIG. 4 is a perspective view of an outer case of the cable reel device of FIG. 1.
Figure 5:
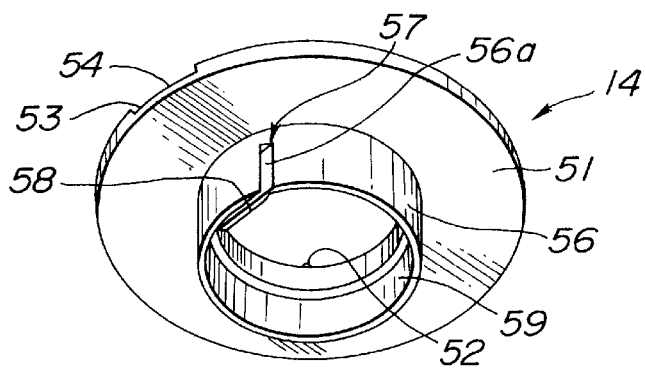
FIG. 5 is a perspective view of a rotor of the cable reel device of FIG. 1.

As shown in FIGS. 1 and 2, the stator 15 includes a disc-shaped lower plate section 41 which is to fit to the vicinity of the lower end section of the outer cylindrical section 31 of the outer case 16. This lower plate section 41 is formed at its central portion with a fitting hole 41a. Additionally, the lower plate section 41 is formed at its outer peripheral section with projecting piece sections 42 which are respectively to fit to the groove sections 35a of the stator fixing sections 35. Each projecting piece section 42 is formed with a caulk hole 42a in which the caulk pin 35b of the stator fixing section 35 is to be inserted. The stator 15 and the outer case 16 are fixed by inserting the caulk pins 35b of the stator fixing sections 35 respectively into the caulk holes 42a and then by thermally caulking the caulk pins 35b onto the projecting piece sections 42 under heating. The lower plate section 41 is formed at the upper surface with two annular grooves 43a, 43b which sink downwardly. The lower plate section 41 of the stator 15 is provided at the vicinity of the outer peripheral portion with a generally cylindrical frame section 44 which extends upwardly. This frame section 44 is formed to be located inside the outer cylindrical section 31 of the outer case 16 in a manner to be spaced from the outer cylindrical section 31, so that an outer peripheral-side space 45 is formed between the outer cylindrical section 31 and the frame section 44. Additionally, the frame section 44 is provided at its one side portion with an outer peripheral-side cable drawing-out section 46. This outer peripheral-side cable drawing-out section 46 includes an inserting section or opening 44a formed in the frame section 44. A generally arcuate (in section) closing plate 47 is formed at the inner peripheral side of the frame section 44 in a manner to cover the inserting section 44a. The flat cable 22 stored in the cable storing section 17 is put between the frame section 44 and the closing plate 47 and kept vertical to the lower plate section 41 of the stator 15. Further, the flat cable 22 is disposed to pass through a space between the frame section 44 and the closing plate 47 and drawn out to the outer peripheral side of the frame section 44 through the inserting section 44a. The flat cable 22 drawn out to the outer peripheral side of the frame section 44 is folded back along the outer peripheral surface of the frame section 44 and then further folded back downwardly at a folding line crossing the width direction of the flat cable 22. The outer peripheral side cable drawing-out section 46 is formed at its lower part with a lower cable supporting section 48 which has a pair of engagement claws 48a, 48a located respectively at the opposite sides. The vicinity of one end section of the flat cable 22 is supported in an engaging manner by allowing the engagement claws 48a, 48a to engage respectively with engagement grooves 22b, 22b formed on the alternation section 22a of the flat cable 22. Additionally, the outer peripheral side cable drawing-out section 46 and the alternation section 22a of the flat cable 22 are covered with the cable drawing-out section 36 of the outer case 16.

As shown in FIGS. 1 to 3 and 5, the rotor 14 includes a generally disc-shaped upper plate section 51 which is rotatably disposed inside the vicinity of the upper end portion of the outer cylindrical section 31 of the outer case 16 in a state to be in slidable contact with the two liner projections 37a, 37b formed projecting on the upper surface of the guide member supporting section 37 of the outer case 16. Additionally, the upper plate section 51 is formed at its central portion with a circular hole 51a. Caulk pins 52 are formed projecting respectively at the four locations of the upper plate section 51 around the circular hole 51a. The upper plate section 51 is formed at one side portion of the circular hole 51a with an upper cable support section 53 which includes an engagement groove 54 formed sinking on the surface of the upper plate section 51. Engagement claws 55, 55 are formed at the opposite sides of the engagement groove 54. The upper plate section 51 is provided at its lower side surface with a generally cylindrical shaft section 56 which is to be located around the circular hole 51a and projects downwardly from the lower side surface of the upper plate section 51. The cable storing section 17 is formed between the shaft section 56 of the rotor 14 and the frame section 44 of the stator 15 under a state in which the rotor 14 and the stator 15 are combined with each other. The shaft section 56 is formed at its one side portion with an inner peripheral-side cable drawing-out section 57 which includes an insertion section or opening 56a formed in the shaft section 56. A closing plate 58 is formed at the inner peripheral side in a state to cover the insertion section 56a. The flat cable 22 stored in the cable storing section 17 is disposed to pass through the insertion section 56a and further passes through a space between the inner peripheral surface of the shaft section 56 and the closing plate 58, and then is drawn out to the inner peripheral side of the shaft section 56. The flat cable 22 drawn out to the inner peripheral side of the shaft section 56 is folded back along the inner peripheral surface of the shaft section 56 and then folded back upwardly at a folding line crossing the width direction of the flat cable 22, and further folded back along the upper surface of the upper plate section 51. The alternation section 22a in the vicinity of the other end section of the flat cable 22 is fitted to the engagement groove 54 of the upper side cable support section 53 of the upper plate section 51, in which the vicinity of the other end section of the flat cable 22 is engagingly supported to the rotor 14 under a state in which the engagement claws 55, 55 at the opposite sides are respectively in engagement with the engagement grooves 22b, 22b of the alternation section 22a. Additionally, a generally annular projecting section 59 is formed thick to project radially inwardly along the upper end portion of the inner peripheral section of the shaft section 56 except for a location near the cable supporting section 53.

A grapple member 12 includes an generally inner cylindrical section 61 which is generally cylindrical and adapted to fit around the steering shaft or a boss (not shown) of the steering wheel installed to the steering shaft and fit inside the shaft section 56 of the rotor 14. The inner cylindrical section 61 is formed at its upper end portion with a generally annular flange section 62 which projects radially outwardly. Further, fixing piece sections 63 are formed projecting respectively at the four locations of the flange 62. Each fixing piece section 63 is formed with a caulk hole 63a. Additionally, the inner cylindrical section 61 is formed at its lower end portion with stator fitting sections 64 which are located along the periphery of the inner cylindrical section 61 to project downwardly and radially outwardly. Each stator fitting section 64 is generally C-shaped in section and formed to be elastically deformable radially inwardly. Furthermore, the flange section 62 is provided at its one side portion with a cable pressing-down section 65 of the generally C-shape in section in a manner to project upwardly and radially outwardly. The grapple member 12 is fastened to the rotor 14 to be rotatable with the rotor 14 by inserting the caulk pins 52 of the rotor 14 into the respective caulk holes 63a of the fixing piece sections 63 of the grapple member 12 and by thermally caulking the caulk pins 52 under a state in which the inner cylindrical section 61 is fitted inside the shaft section 56 of the rotor 14 while the flange section 62 is in contact with the upper surface of the upper plate section 51 of the rotor 14. Additionally, in this state, the cable pressing-down section 65 of the grapple member 12 fits on the upper side of the alternation section 22a in the vicinity of the end section of the flat cable 22 thereby pressing down the alternation section 22a. Further, the stator fitting sections 64 of the grapple member 12 are press-fitted into the fitting hole 41a of the lower plate section 41 of the stator 15, in which engaging claws forming part of the fitting sections 64 are first inwardly elastically deformed upon contacting with the inner periphery of the fitting hole 41a of the lower plate section 41 and then further outwardly elastically deformed to be restored to their original shape under the state it has passed through the lower plate section 41. Thus, a slidable fitting is established between the stator fitting section 64 and an inner peripheral edge of the lower plate section 41 defining the fitting hole 41a. In this state, a combined unit of the grapple member 12 and the rotor 14 and another combined unit of the outer case 16 and the stator 15 are rotatably assembled with each other.

Figure 6:
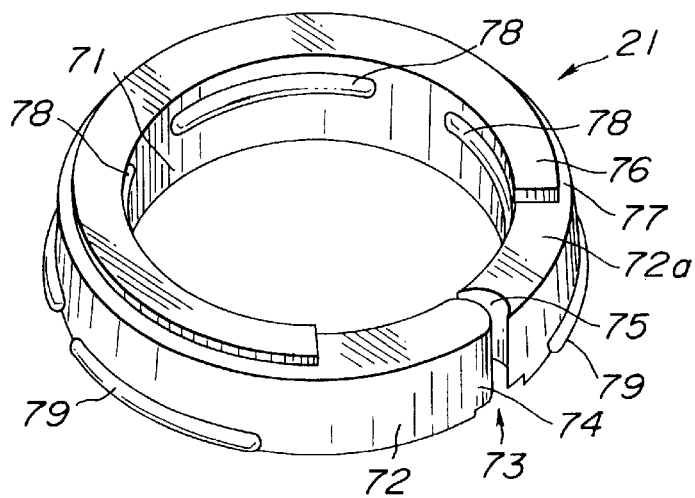
FIG. 6 is a perspective view of a guide member of the cable reel device of FIG. 1.

As shown in FIGS. 1, 2 and 6, the guide member 21 is formed generally annular and disposed between the shaft section 56 of the rotor 14 and the frame section 44 of the stator 15. This guide member 21 includes an inner wall section 71 facing the outer peripheral surface of the shaft section 56, and an outer wall section 72 coaxial with the inner wall section 71 and facing the inner peripheral surface of the frame section 44. The upper end portion of the inner wall section 71 and the upper end portion of the outer wall section 72 are integrally connected with an upper wall section 72a so that the guide member 21 is formed generally C-shaped in section. The lower end portion of the inner wall section 71 and the lower end portions of the outer wall section 72 are slidably fitted respectively in the grooves 43a, 43b of the stator 15, so that the guide member 21 is rotatably guided around the shaft section 56 of the rotor 14 while being prevented from being radially rickety. Furthermore, the guide member 21 is formed at its one side portion with a turning-over insertion section or slit 73 through which the inner and outer peripheral sides of the guide member 21 is communicated with each other. The turning-over insertion section 73 is formed generally arcuate in section and includes a convex surface 74 and a concave surface 75 which face each other in the peripheral direction of the guide member 21. Each surface 74, 75 extends in the axial direction of the guide member 21. Each of these convex and convex surfaces 74, 75 is formed smooth and in the curved-surface shape. The upper wall section 72a of the guide member 21 is formed at its upper surface with an arcuate or generally C-shaped flat projection 76 which projects upwardly to form an engaging step section 77 located at an outer peripheral side relative to the projection 76. The engaging step section 77 is to be slidably fitted to the inner peripheral portion of the guide member supporting section 37 of the outer case 16.

The guide member 21 is provided with a plurality of inside linear projections 78 which are located at predetermined intervals on the peripheral surface of the inner wall section 71 in the vicinity of the upper end portion and formed as projections whose axis extends in the peripheral direction of the guide member 21. Additionally, a plurality of outside linear projection 79 are formed to be located at predetermined intervals on the peripheral surface of the outer wall section 72 in the vicinity of the lower end portion and formed to extend in the peripheral direction of the guide member 21. Each of the projections 78, 79 is semicircular in section and has a surface formed smooth. The total of the radially inward dimension of the inside linear projection 78 and the thickness dimension of the inner wall section 71 is larger than the width (radially inward) dimension of the inside annular groove 43a of the stator 15. The total of the radially inward dimension of the outside linear projection 79 and the thickness of the outer wall section 72 is larger than the width (radially outward) dimension of the outside groove 43b of the stator 15. The tip end portion of the inside linear projection 78 is located projecting to the inner peripheral side beyond the inside groove 43a, whereas the tip end portion of the outside linear projection 79 is located projecting to the outer peripheral side beyond the outside groove 43b. Accordingly, the flat cable 22 can be prevented from being accidentally put between the guide member 21 and the surface of each of the inner and outer grooves 43a, 43b. As a result, the flat cable 22 can be smoothly moved while allowing the cable reel device to make its stable rotational operation.

The flat cable 22 stored in the cable storing section 17 is inserted in and passed through the turning-over insertion section or slit 73 of the guide member 21. Under a state in which the flat cable 22 is turned over to be bent in the generally U-shape along the turning-over insertion section 73, the flat cable 22 is wound to be located between the outer peripheral surface of the shaft section 56 and the inner peripheral surface of the inner wall section 71 of the guide member 21, and further wound to be located between the inner peripheral surface of the frame section 44 and the outer peripheral surface of the outer wall section 72 of the guide member 21. In other words, the flat cable 22 is wound counterclockwise and in a direction from the inner peripheral side to the outer peripheral side at the inside of the guide member 21, and wound clockwise and in a direction from the inner peripheral side to the outer peripheral side at the outside of the guide member 21, as viewed from the above. Under this condition, each linear projection 78, 79 of the guide member 21 is located to be in contact with only parts of the film F itself of the flat cable 22 avoiding a contact with parts corresponding to the conductor wires C.

The thus arranged cable reel device R is mechanically installed to a steering column (not shown) in such a manner that the inner cylindrical section 61 of the grapple member 12 is fitted on the steering shaft while the stator 15 is fixed to the combination switch, and the rotor 14 is fastened to the boss plate of the steering wheel. With this cable reel device R, the connector of the flat cable 22 drawn out onto the upper side of the cable reel device R is connected to the corresponding opposite connector disposed inside the steering wheel so that the cable reel device is electrically connected to the electrical component parts such as an ignitor of the airbag system and a horn switch. The connector of the flat cable 22 drawn out onto the lower side of the cable reel device is connected to the corresponding opposite connector disposed on the vehicle body side so that the cable reel device 22 is electrically connected to the electrical component parts disposed on the vehicle body side, such as the battery and the impact sensor. Thus, the cable reel device R is arranged to electrically connect the former electrical component parts and the latter electrical component parts.

The manner of operation of the first embodiment cable reel device will be discussed hereinafter.

Figure 7A:
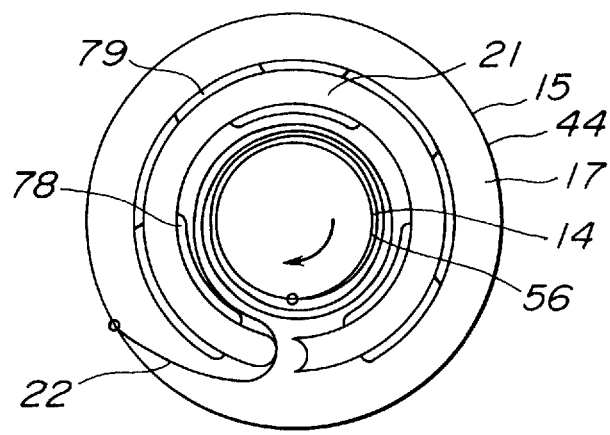
FIGS. 7A to 7C are explanatory views showing operational modes of the cable reel device of FIG. 1.

First, under a condition in which the steering wheel is operated to make its maximum rotation counterclockwise as viewed from the upper side (a vehicle passenger side), the flat cable 22 is wound clockwise to be tightened in the direction from the outer peripheral side to the inner peripheral side upon being pulled by the shaft section 56 of the rotor 14 as shown in FIG. 7A.

Then, when the steering wheel is operated to rotate counterclockwise from the condition shown in FIG. 7A, the flat cable 22 is first unwound inside the guide member 21 and is brought into press contact with the inner peripheral surface of the inner wall section 71 of the guide member 21.

Figure 7B:
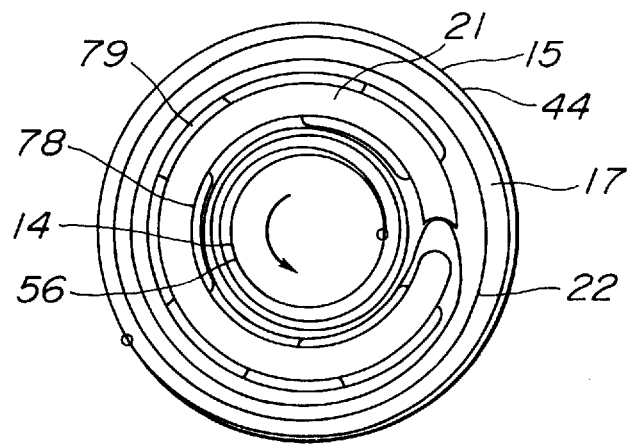

When the steering wheel is further operated to rotate counterclockwise, the flat cable 22 is drawn out of the guide member 21 through the turning-over insertion section 73 of the guide member 21 as shown in FIG. 7B. At this time, the flat cable 22 is bent in the generally U-shape at the turning-over insertion section 73 while pressing the concave surface 75 of the turning-over insertion section 73 thereby causing the guide member 21 to rotate counterclockwise. The flat cable 22 which has been drawn out of the guide member 21 through the turning-over insertion section 73 is pressed and wound on the inner peripheral surface of the frame section 44 of the stator 15 under the elasticity of itself.

Figure 7C:
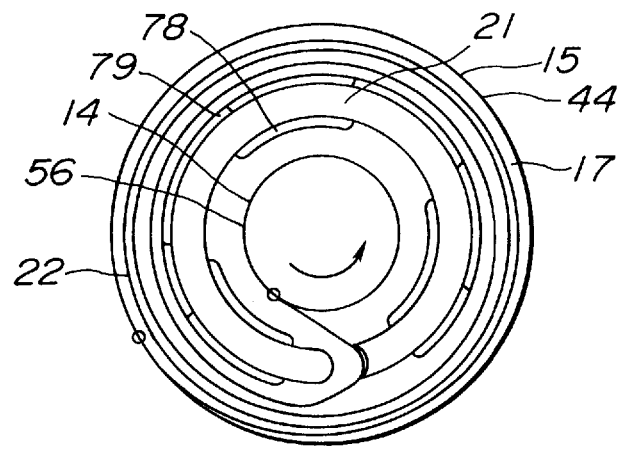

Under a condition in which the steering wheel is operated to make its maximum rotation counterclockwise, the almost whole of the flat cable 22 is pressed on the inner peripheral surface of the frame section 44 of the stator 15 so as to be wound thereon counterclockwise and rolled in the direction from the outer peripheral side to the inner peripheral side as shown in FIG. 7C.

When the steering wheel is operated to rotate clockwise from the condition as shown in FIG. 7C, the flat cable 22 is pulled by the shaft section 56 of the rotor 14 and wound on the outer peripheral surface of this shaft section 56. At this time, the flat cable 22 is drawn inside of the guide member 21 through the turning-over insertion section 73 while pressing the convex surface 74 of the turning-over insertion section 73 thereby causing the guide member 21 to rotate clockwise.

Under a condition in which the steering wheel has been operated to make its maximum rotation clockwise, the almost whole of the flat cable 22 is wound on the outer peripheral surface of the shaft section 56 of the rotor 14, so that the condition is restored to one shown in FIG. 7A.

Thus, according to the cable reel device R of this embodiment, the flat cable 22 can be wound in the right or reverse direction inside the cable storing section 17 under the condition that the steering wheel is operated to rotate in the right or reverse direction. Consequently, the length dimension of the flat cable 22 to be used in this cable reel device R can be largely reduced as compared with the case of a conventional cable reel device which is arranged such that a flat cable (22) is wound or unwound under a condition to be wound in one direction on a central shaft. Additionally, since the flat cable 22 can be wound separately on the outer peripheral surface of the shaft section 56 of the rotor 14 and on the inner peripheral surface of the frame section 44 of the stator 15, the flat cable 22 can be moved smoothly thereby achieving a stable rotational operation of the cable reel device.

As discussed above, the guide member 21 is formed at its inner and outer side surfaces with inner and outer linear projections 78, 79 which extend in the peripheral direction of the guide member 21. Consequently, the contacting surface area between the guide member 21 and the flat cable 22 becomes small and therefore the frictional resistance therebetween is lowered to allow the flat cable to move smoothly. It is to be noted that the flat cable 22 can be smoothly drawn through the turning-over insertion section 73 because the flat cable 22 is in sliding contact with the inner linear projections 78 formed projecting on the inner peripheral surface of the guide member 21 so as to reduce the frictional resistance therebetween, although a disorder in winding of the flat cable 22 tends to occur in the vicinity of the turning-over insertion section 73 particularly when the flat cable 22 is unwound from the shaft section 56 of the rotor 14. Accordingly, the flat cable 22 can smoothly move thereby achieving a stable rotational operation of the cable reel device. As a result, the cable reel device of the embodiment does not require a sliding sheet or the like and therefore requires a storing space corresponding only for the wound amount of the flat cable 22 itself, thus allowing the cable reel device to be small-sized.

The inner linear projections 78 are formed near the upper end portion of the guide member 21 while the outer linear projections 79 are formed near the lower end portion of the guide member 21. As a result, the respective linear projections 78, 79 are prevented from being brought into local contact with the flat cable 22 thereby preventing the flat cable 22 from being injured.

These linear projections 78, 79 are formed to be in contact with parts of only the film F itself avoiding the contact with parts corresponding to the respective conductor wires C, and therefore the respective conductor wires C can be further securely prevented from being injured.

The guide member 21 is formed of a plastic as a one-piece body, and the respective linear projections 78, 79 are formed integral with the guide member 21 to project from the guide member 21. As a result, the structure of the guide member 21 is simplified. Thus, the number of components parts is reduced while lowering the material cost and improving the operational efficiency, thereby making it possible to reduce the production cost of the cable reel device as compared with a conventional cable reel device using a plurality of rollers to constitute a guide member (21) and a conventional arrangement in which a processing is applied to the whole length of a flat cable (22).

Since the lower plate section 41 of the stator 15 is formed with the annular grooves 43a, 43b to which the lower end portions of the inner wall section 71 and the outer wall section 72 of the guide member 21 respectively slidably fit, the guide member 21 can be prevented from being rickety in a radial direction thereby making it possible to allow the guide member 21 to smoothly rotate in a predetermined position. As a result, the flat cable 22 can be smoothly move while suppressing generation of foreign noise or the like.

Furthermore, the guide member 21 is provided with inner and outer linear projections 78, 79 which are disposed projecting respectively at the inner and outer peripheral sides of the guide member 21, and therefore the flat cable 22 can be prevented from being accidentally put between the guide member 21 and the surface of each of the inner and outer grooves 43a, 43b. As a result, the flat cable 22 can be smoothly moved while allowing the cable reel device to make its stable rotational operation.

Figure 8:
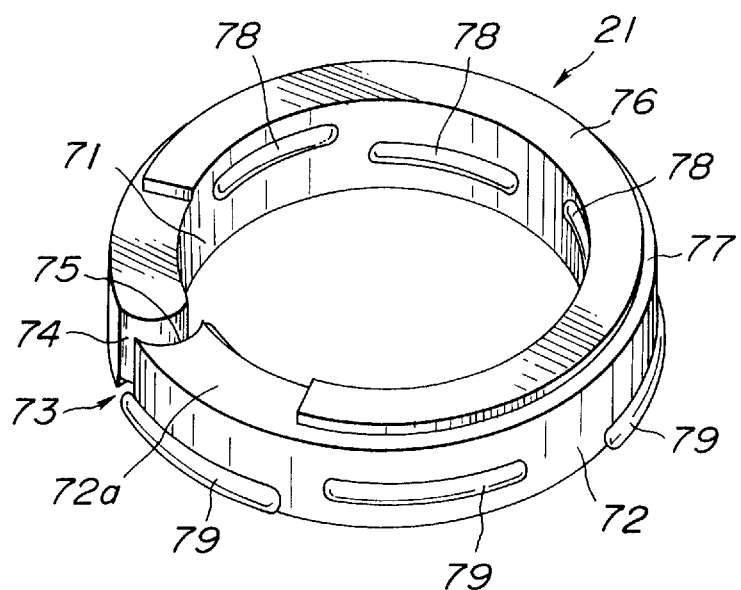
FIG. 8 is a perspective view of a modified example of the guide member of the first embodiment cable reel device.

Although the inner linear projections 78 are shown and described as being formed in the vicinity of the upper end portion of the guide member 21 while the outer linear projections 79 are formed in the vicinity of the lower end portion of the guide member 21 in the above embodiment, it will be understood that the respective linear projections 78, 79 may be distributed in a vertical direction (or the axial direction of the guide member 21) thereby preventing the respective linear projections 78, 79 from locally contacting with the flat cable 22 thus suppressing the damage of the flat cable 22, as shown in FIG. 8.

Figure 9:
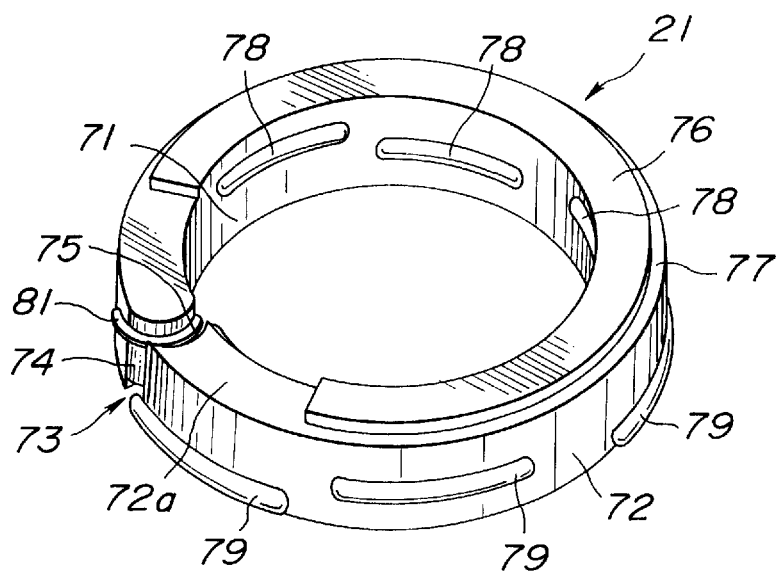
FIG. 9 is a perspective view of another modified example of the guide member of the first embodiment cable reel device.

As shown in FIG. 9, a linear projection 81 may be formed on at least one of the convex surface 74 and the concave surface 75 of the turning-over insertion section 73 of the guide member 21, thereby further reducing the frictional resistance between the flat cable 22 and the guide member 21.

While the inner and outer linear projections 78, 79 of the guide member 21 have been shown and described as being formed intermittently in the peripheral direction of the guide member 21 in the above embodiment and the modified examples, it will be appreciated that each of the linear projections 78, 79 may be formed to continuously extend in the generally annular shape.

The flat cable 22 including a plurality of parallel arranged conductor wires C has been shown and described as being used as a cable, it will be understood that a generally cylindrical electric cable formed by storing a plurality of conductor wires in an insulating tube may be used therefor, and additionally optical fibers may be used in place of the conductor wires.

As apparent from the above, according to the above embodiment of the cable reel device R, when the cable is unwound from the shaft section, the cable is brought into contact with the projections formed projecting at the inner peripheral side of the guide member, and therefore the frictional resistance between the guide member and the cable is reduced so that the cable can be smoothly drawn out of the turning-over insertion section of the guide member. As a result, the cable can be smoothly move without causing the disorder in winding thereby obtaining a stable relative rotation between the frame section and the shaft section. Additionally, the structure of the cable reel device is simple, and therefore the production cost can be largely lowered.

Figure 10:
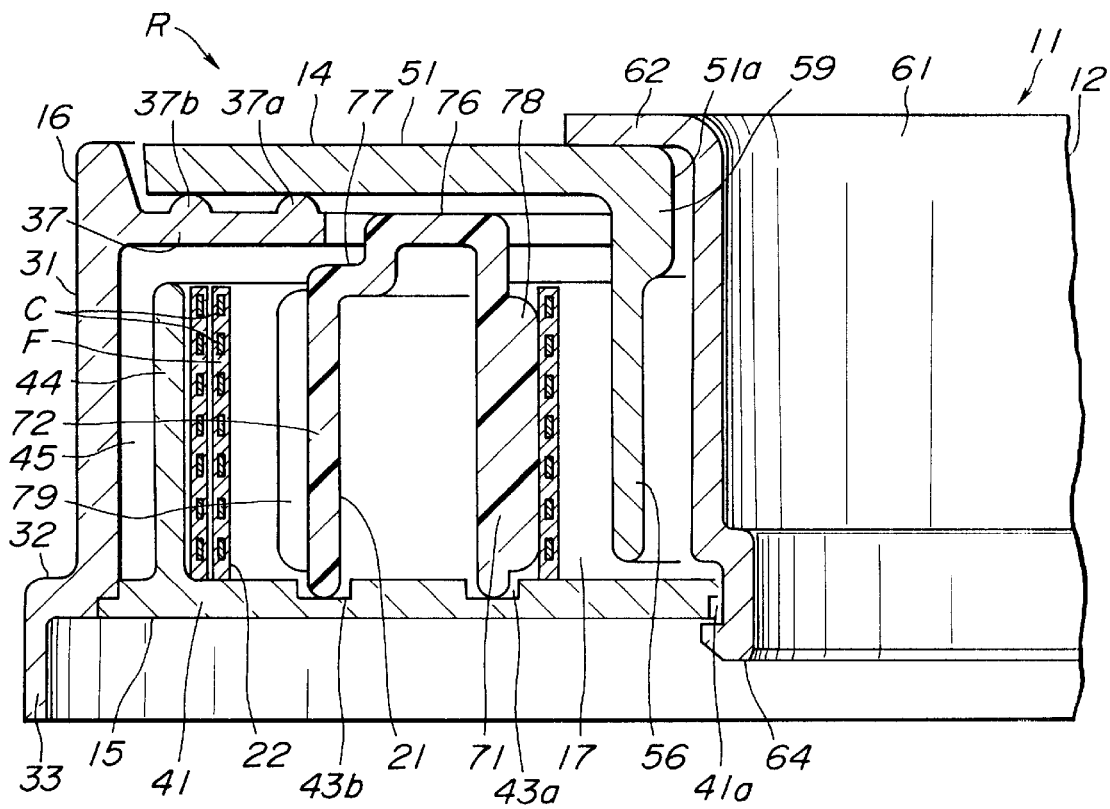
FIG. 10 is a fragmentary sectional view of an essential part of a modified embodiment of the first embodiment cable reel device.
Figure 11:
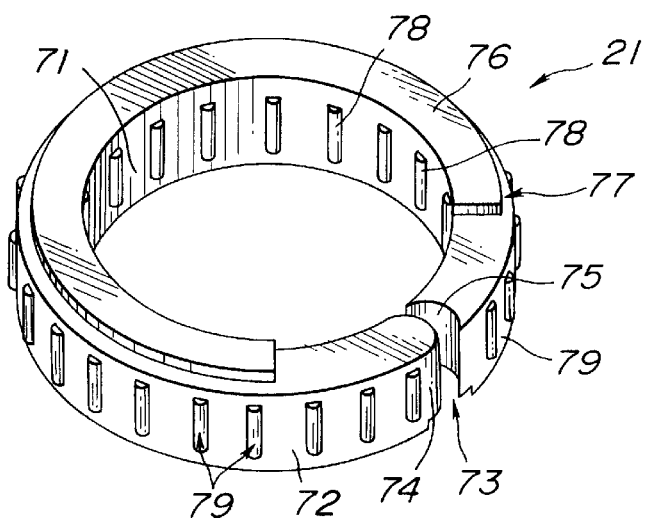
FIG. 11 is a perspective view of a guide member of the cable reel device of FIG. 10.

FIGS. 10 and 11 show a modified example of the guide member 21 of the above-discussed embodiment cable reel device R. The guide member 21 of this example is provided with a plurality of the inside linear projections 78 which are located at predetermined intervals at the inner peripheral surface of the guide member 21. Each linear projection 78 extends in the axial direction of the guide member 21. Additionally, a plurality of the outside linear projection 79 are located at predetermined intervals on the outer wall section 72 at the outer peripheral surface and formed to extend in the axial direction of the guide member 21. Each of the projections 78, 79 is semicircular in section and has a surface formed smooth.

Figure 12A:
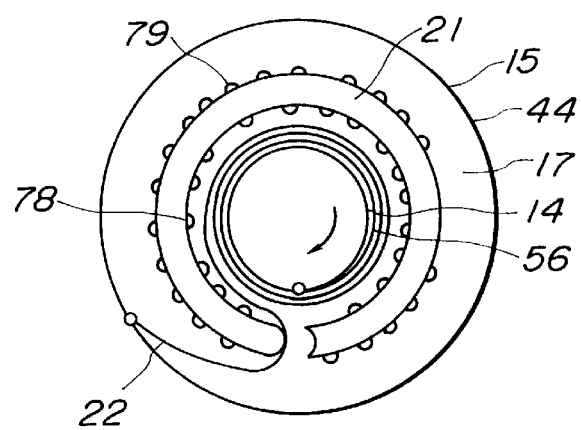
FIGS. 12A to 12C are explanatory views showing operational modes of the cable reel device of FIG. 10.
Figure 12B:
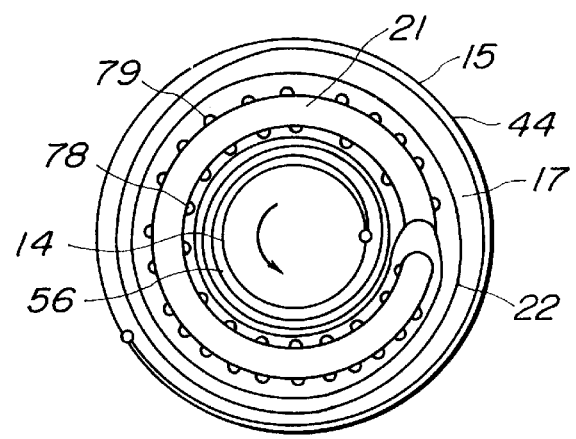
Figure 12C:
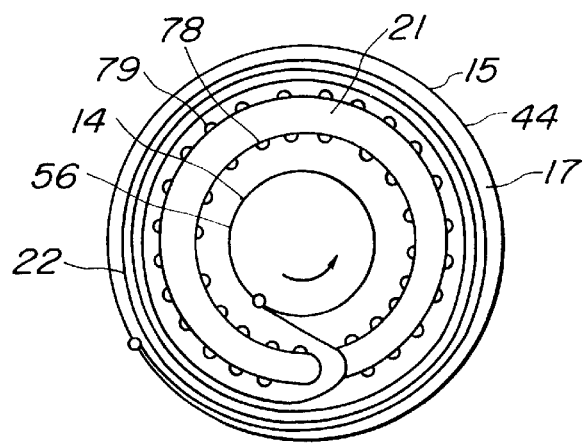

It will be understood that, also in this example, the total of the radially inward dimension of the inside linear projection 78 and the thickness dimension of the inner wall section 71 is larger than the width (radially outward) dimension of the outside annular groove 43a of the stator 15. The total of the radially inward dimension of the outside linear projection 79 and the thickness of the outer wall section 72 is larger than the width (radially outward) dimension of the outside groove 43b of the stator 15. The tip end portion of the inside linear projection 78 is located projecting to the inner peripheral side beyond the inside groove 43a, whereas the tip end portion of the outside linear projection 79 is located projecting the outer peripheral side beyond the outside groove 43b. FIGS. 12A to 12C show operational modes in the manner of operation of the cable reel device R including the modified example of the guide member 21 of FIGS. 10 and 11, similar to that of the first embodiment of FIGS. 1 to 7. It will be understood that FIGS. 12A to 12C correspond respectively to FIGS. 7A to 7C.

Figure 13:
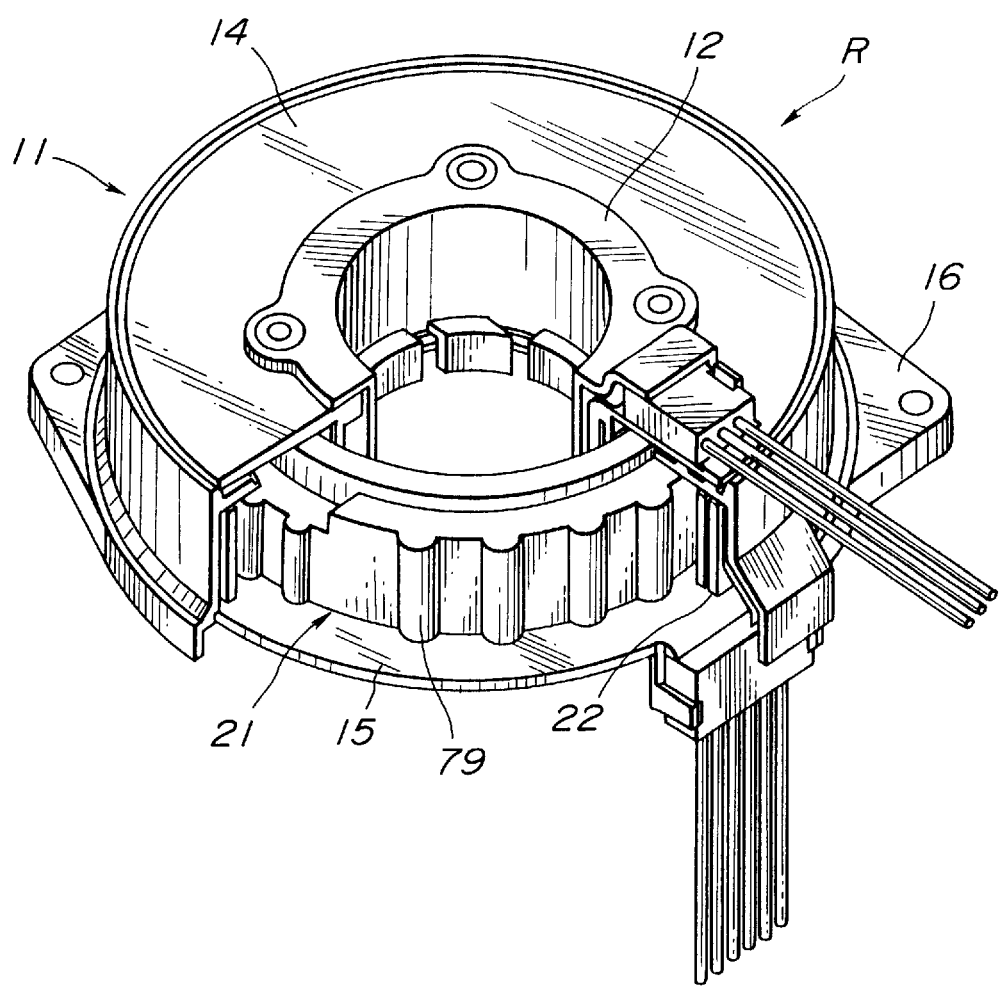
FIG. 13 is a perspective view, partly in section, showing a modified example of the guide member of FIGS. 10 and 11.

FIG. 13 shows a modified embodiment of the cable reed device R including an example of the guide member 21 similar to the example of FIGS. 10 and 11. In the guide member 21 of this example, each outer liner projection 79 extends from the top surface to the bottom surface of the guide member 21.

Figure 14:
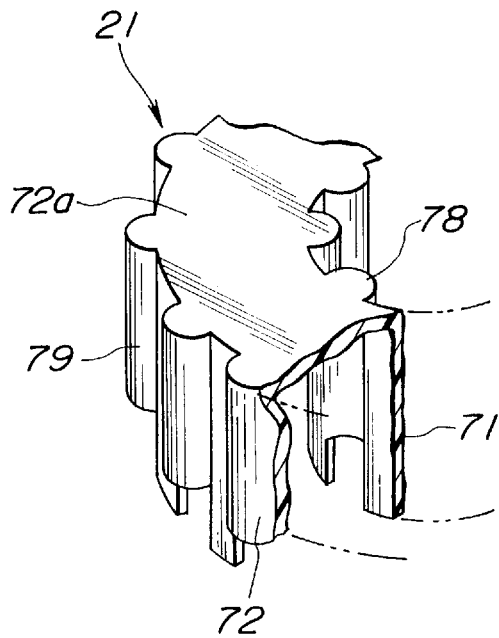
FIG. 14 is a fragmentary perspective view, partly in section, of another modified example of the guide member of FIGS. 10 and 11.
Figure 15:
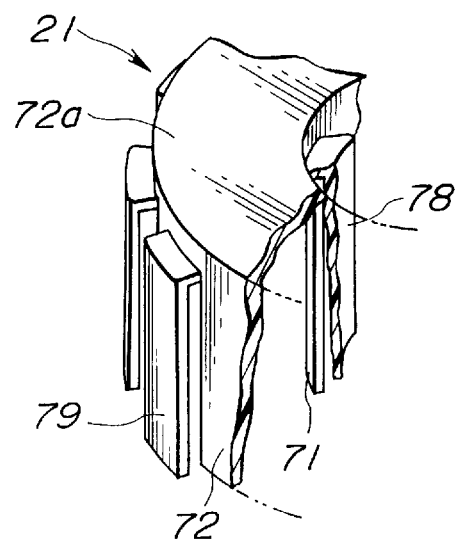
FIG. 15 is a fragmentary perspective view, partly in section, of a further modified example of the guide member of FIGS. 10 and 11.

It will be appreciated that the inner and outer linear projections 78, 79 of the guide member 21 of FIGS. 10 to 13 may be ones which are obtained by forming unevenness in the wavy pattern in section, on the surface of the inner and outer wall section 71, 72 as shown in FIG. 14, or otherwise by forming openings (like cutouts) and hook-shaped (in section) projections in the inner and outer wall sections 71, 72 as shown in FIG. 15. In the arrangement obtained by the former formation method, the wall thickness of the liner projections can be set generally at the same value as that of the inner and/or outer wall section 71, 72 thereby achieving the weight-lightening of component parts while suppressing problems of depression, warp and the like of the guide member 21 under shrinkage of a plastic during a fabrication or molding. In the arrangement obtained by the later formation method, the openings formed adjacent the hook-shaped projections can be set as a contacting surface between male and female molds thereby suppressing the dimensional change of a metallic mold even at a high injection pressure of a molten plastic during molding thus making it possible to obtain a high precision molded product.

Figure 16:
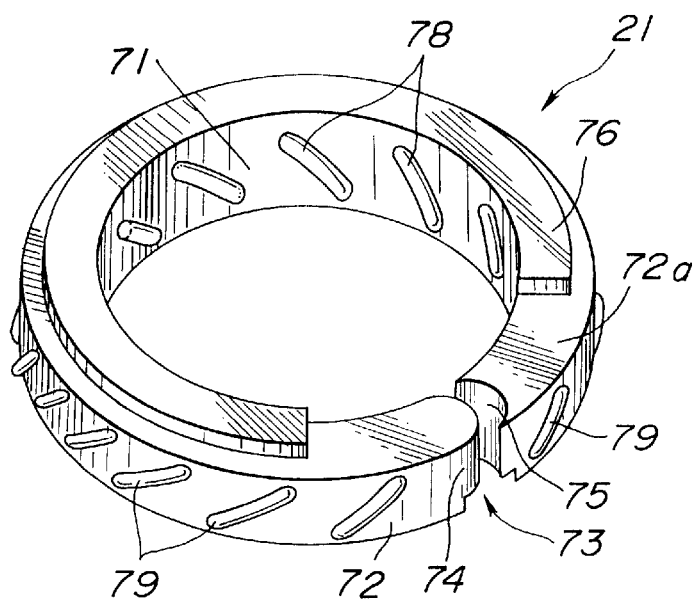
FIG. 16 is a perspective view of a still further modified example of the guide member of FIGS. 10 and 11.

While the inner and outer linear projections 78, 79 of the guide member 21 have been shown and described as being formed in the axial direction of the guide member 21 in the above embodiments, it will be appreciated that each of the linear projections 78, 79 may be obliquely formed to extend in a direction inclined relative to the peripheral direction of the guide member 21 as shown in FIG. 16.

Figure 18:
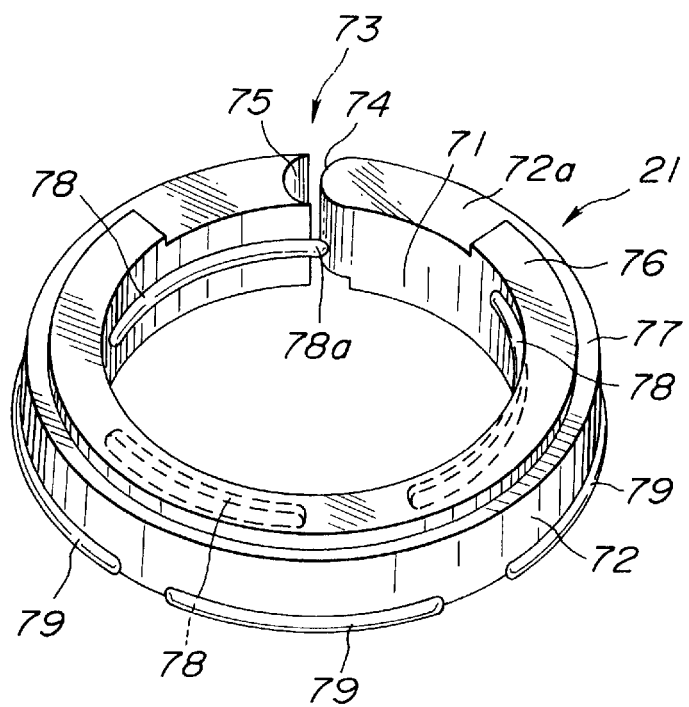
FIG. 18 is a perspective view of a guide member of the cable reel device of FIG. 17.
Figure 17:
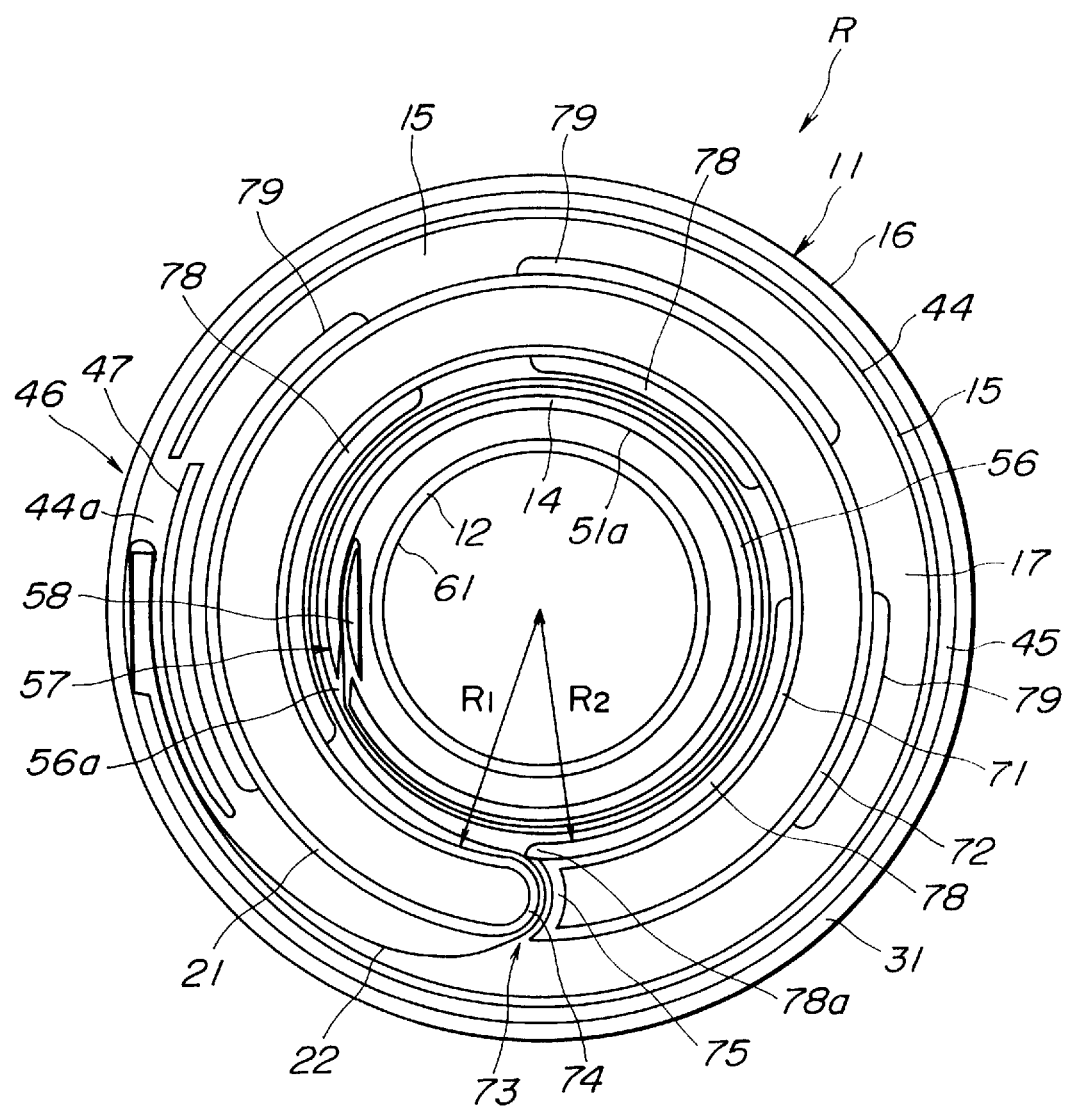
FIG. 17 is a transverse sectional view of a second embodiment of the cable reel device according to the present invention.

FIGS. 17 and 18 illustrate a second embodiment of the cable reel device according to the present invention, similar to the first embodiment of FIGS. 1 to 6. In this embodiment, no inner linear projection 78 is formed at a position near the convex surface 74 of the turning-over insertion section 73. One of the inner linear projections 78 has a tip end section 78a which is formed projecting beyond the axial end portion of the concave surface 75. As a result, the inner peripheral configuration of the guide member 21 is set such that the apparent radial dimension $R_1$ at the side of the convex surface 74 is larger than the apparent radial dimension $R_2$ at the side of the concave surface 75 as shown in FIG. 17. The apparent radial dimension $R_1$ is defined by the inner peripheral surface of the inner wall section 71 of the guide member 21, whereas the apparent radial dimension $R_2$ is defined by the inner peripheral surface of the inner linear projection 78.

It is to be noted that the radial dimension $R_2$ at the side of the concave surface 75 is set to provide a slight room for the wound flat cable 22 when the flat cable 22 has been wound with the maximum length on the outer peripheral surface of the shaft section 56.

Figure 19A:
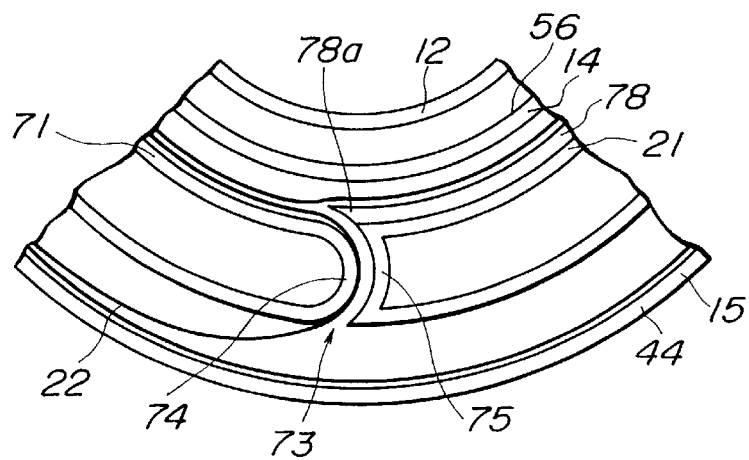
FIGS. 19A to 19C are explanatory views showing operational modes of the cable reel device of FIG. 17.
Figure 19B:
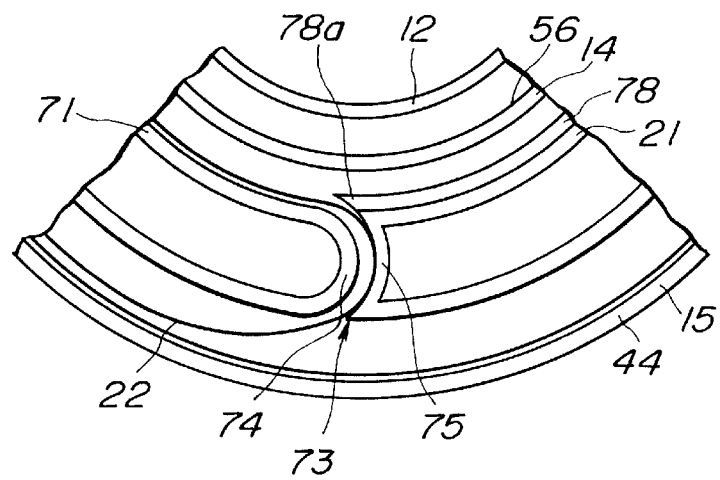
Figure 19C:
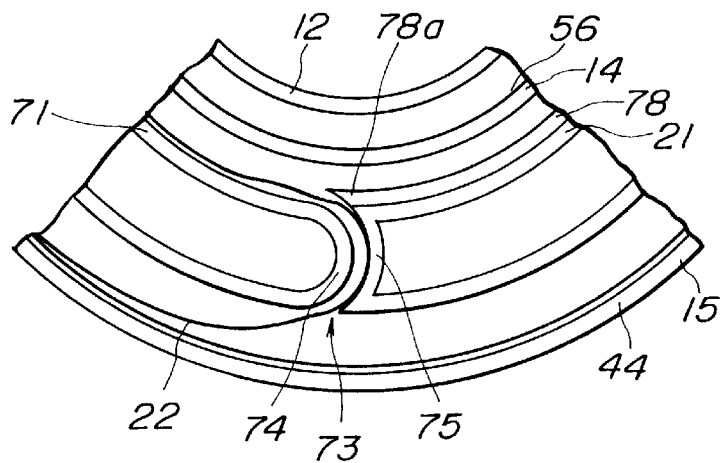

Accordingly, when the flat cable 22 is unwound, the flat cable which is being drawn out along the side of the convex surface 74 is guided by the tip end section 78a of the inner linear projection and curved along the concave surface 75, and then smoothly introduced into the turning-over insertion section or slit 73. In this connection, FIGS. 19A to 19C show respectively operational modes in the manner of operation of the cable reel device R, in which FIGS. 19A to 19C correspond respectively to FIGS. 7A to 7C of the first embodiment. Thus, also when the flat cable 22 is unwound from the shaft section 56 of the rotor 14, the flat cable 22 is prevented from being projected inside and buckled like a case in which a guide member 21a has a radial dimension R1 on the side of the convex surface 74 is equal to a radial dimension of the concave surface 75 as shown in FIG. 10. Accordingly, the flat cable 22 can smoothly move without causing a disorder in winding thereby allowing the cable reel device to make its stable rotational operation regardless of a change in frictional resistance of the flat cable 22 due to an ambient temperature change. As a result, even if the cable to be used is thin and soft, it can be prevented from buckling and therefore move smoothly thus allowing the frame section and the shaft section to rotate smoothly.

Figure 20:
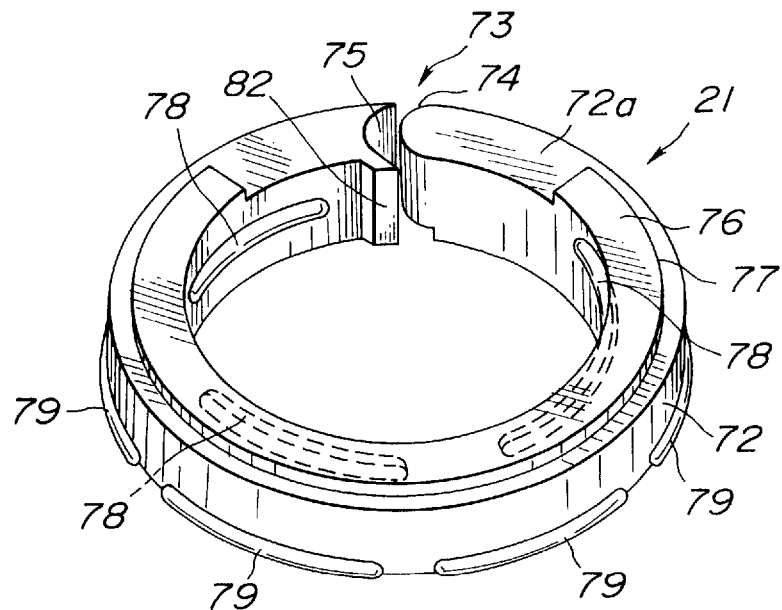
FIG. 20 is a perspective view of a modified example of the guide member of the second embodiment cable reel device.

In the above embodiment, the cable reel device R having the following dimensions are used taking account of a usual dimension of a boss section of the steering wheel: The outer diameter of the shaft section 56 is within a range of 45 mm to 55 mm; and the inner diameter of the frame section 44 is about within a range of 90 mm to 100 mm. Additionally, the flat cable 22 having a thickness dimension about within a range from 0.1 mm to 0.5 mm is usually employed. In such a case, the difference between the above-mentioned radial dimensions $R_1$ and $R_2$ is preferably about within a range from 1 mm to 5 mm. However, such dimensions may not be limited to the above. Additionally, the inner linear projection 78 of the guide member 21 is formed extending to project beyond the concave surface 75 to guide a curved portion of the flat cable 22. In this connection, as shown in FIG. 20, a projection 82 extending in a vertical or axial direction may be formed along the edge portion of the concave surface 75 at the inside surface of the guide member 21, so that this projection 82 can effectively guide the curved portion of the flat cable 22. Additionally, this projection 82 may be formed in such a manner that the above-mentioned radial dimension $R_2$ gradually increases in a direction far from the turning-over insertion section 73 so that the radial inward tip of the projection 82 smoothly continues to the inner peripheral surface of the inner wall section 71 of the guide member 21.

Although the inner linear projections 78 are shown and described as being formed in the vicinity of the upper end portion of the guide member 21 while the outer linear projections 79 are formed in the vicinity of the lower end portion of the guide member 21, it will be understood that the respective linear projections 78, 79 may be distributed in a vertical or axial direction thereby preventing the respective linear projections 78, 79 from locally contacting with the flat cable 22 thus suppressing the damage of the flat cable 22.

Also in the example of FIG. 20, a linear projection (81 in FIG. 9) may be formed on and along at least one of the convex surface 74 and the concave surface 75 of the turning-over insertion section 73 of the guide member 21, thereby further reducing the frictional resistance between the flat cable 22 and the guide member 21.

While the inner and outer linear projections 78, 79 of the guide member 21 have been shown and described as being intermittently formed in the peripheral direction of the guide member 21 in the above embodiment, it will be appreciated that these linear projections 78, 79 may be formed continuously and generally annular.

Figure 21:
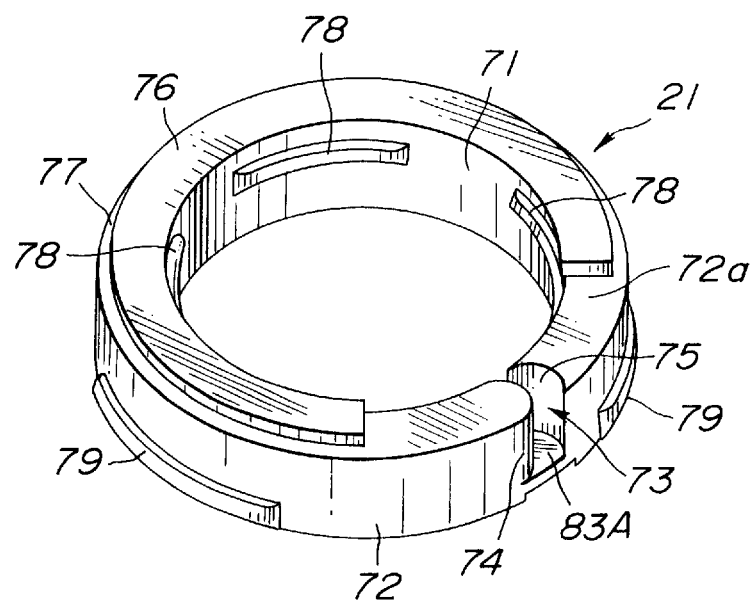
FIG. 21 is a perspective view of a guide member of a third embodiment of the cable reel device according to the present invention.

FIG. 21 illustrates an essential part of a third embodiment of the cable reel device R according to the present invention, similar to the first embodiment cable reel device R. In this embodiment, the guide member 21 is similar to that of the first embodiment cable reel device R and provided with a plate-shaped connecting or bridge section 83A located at the lower side portion of the turning-over insertion section 73 to connect the opposite convex and concave surfaces 74, 75 at the lower portions. The plate-shaped connecting section 83A is formed integral with the turning-over insertion section 73 at a lower side portion to rigidly connect the convex surface 74 and the concave surface 75 of the guide member 21 to each other.

In this guide member 21, the convex and concave surfaces 74, 75 which face each other and located at the opposite sides of the turning-over insertion section 73 are rigidly connected to each other through the connecting section 83A, and therefore the strength of the guide member 21 can be readily increased. As a result, the inherent shape of the guide member 21 can be maintained to allow the guide member 21 to smoothly rotate along the grooves 43a, 43b of the stator 15 even in case that the guide member 21 receives a pressure in a radial, peripheral or torsional direction thereof and even in case that the temperature in a passenger compartment changes within a range from −40° to +100° C.

Upon thus increasing the strength of the guide member 21, the dimension of the opening or slit of the turning-over insertion section 73 can be accurately set. Accordingly, the dimension of the opening of the turning-over insertion section 73 is set at the necessary minimum value, thereby making it possible to introduce the flat cable 22 into the turning-over insertion section 73 of the guide member 21 without causing slackening thereof. In other words, if the width dimension of the slit of the turning-over insertion section 73 of the guide member 21, i.e., the dimension of a distance between the convex and concave surfaces 74, 75 is large, a moving distance of the flat cable 22 from the convex surface 74 to the concave surface 75 is unavoidably increased when the rotor 14 makes its rotational direction change from a right rotation to a reverse rotation. Consequently, slackening of the flat cable 22 will occur near the turning-over insertion section 73 thereby allowing the flat cable 22 to be bent. On the contrary, if the distance dimension between the convex and concave surfaces 74, 75 is minimized, not only there arise problems of a strength shortage in metallic molds in production of metallic molds for the guide member 21 but also the flat cable 22 becomes difficult to pass through the slit of the turning-over insertion section 73 when the guide member 21 makes its thermal deformation or its deformation during molding, thus largely affecting the cable reel device in production and operation. The dimension of the distance between the convex and concave surfaces 74, 75 changes according to the thickness dimension of the flat cable 22 but is preferably about within a range from 1 mm to 10 mm, which has been confirmed to be effective. Particularly in case that the thickness dimension of the flat cable 22 is as thin as about a value within a range from 0.1 mm to 0.2 mm, this distance dimension is preferably about within a range from 2 mm to 5 mm.

Figure 22:
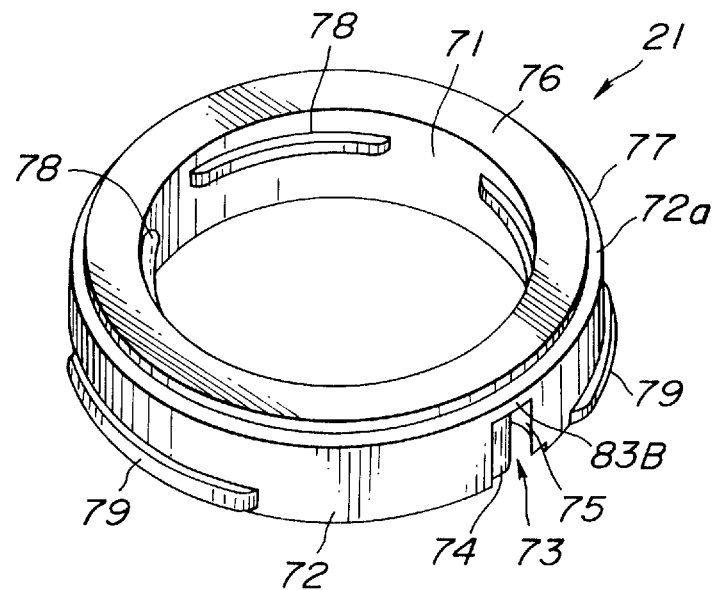
FIG. 22 is a perspective view of a modified example of the guide member of the third embodiment cable reel device.

While the connecting section 83A has been shown and described as being formed at the lower side portion of the turning-over insertion section 73 of the guide member 21, it will be understood that, for example, a connecting section may be located at the upper side portion of the turning-over insertion section 73 of the guide member 21 so as to form the connecting section 83B contiguous with the upper plate section 72a as shown in FIG. 22. In this case, since the upper plate section 72a and the flat projection 76 projecting from the upper plate section 72a are formed annular, the engaging step section 77 of the guide member 21 can be brought into smoothly slidable contact with the guide member support section 37 of the outer case 16 thereby allowing the guide member 21 to smoothly rotate.

Although each of the connecting sections 83A, 83B have been shown and described as being formed integral with the guide member 21 in the above examples, it will be understood that the connecting section 83A, 83B to be used may be a member separate from the guide member 21, in which the member is installed to the guide member 21 under bonding with an adhesive, thermal welding, fixing with small screws, or fixing upon engagement of engaging sections respectively formed at them to be engageable, or the like.

With the guide member 21 of FIGS. 21 and 22, the end portions which face each other and are located at the opposite sides of the turning-over insertion section are rigidly connected to each other by the connecting section. Consequently, the distance dimension between these end portions of the turning-over insertion section can be made constant. This can prevent the cable from becoming difficult to pass through the turning-over insertion section upon the width of the turning-over insertion section being decreased, from tending to be buckled upon the width of the turning-over insertion section being increased, and from being increased in frictional resistance to the casing upon the guide member being distorted. Thus, the cable can be smoothly moved without causing a disorder in winding, thereby allowing the cable reel device to make a stable and smooth operation.

Figure 24:
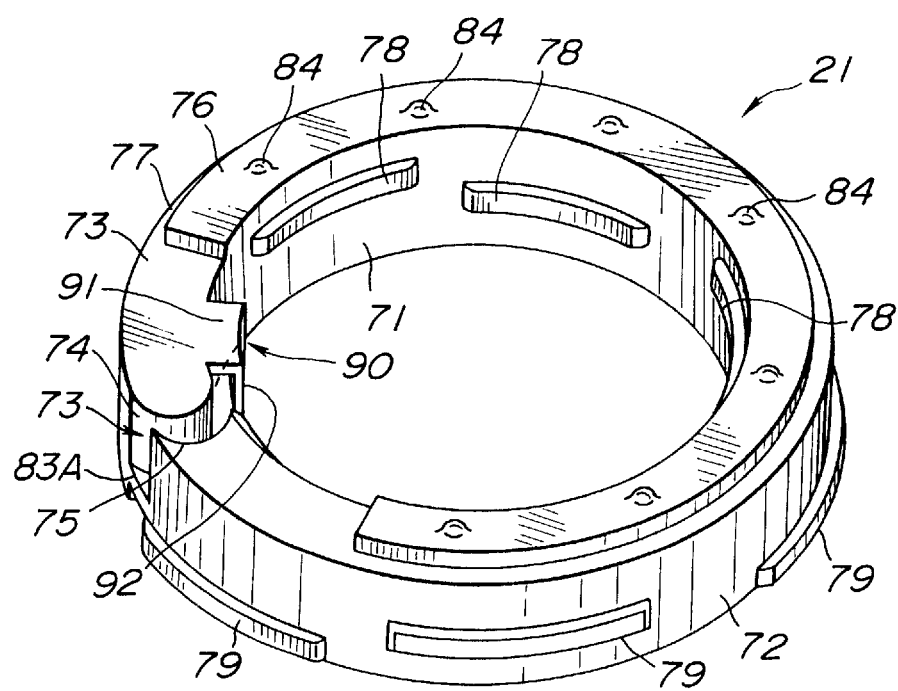
FIG. 24 is a perspective view of the guide member of the cable reel device of FIG. 23.
Figure 23:
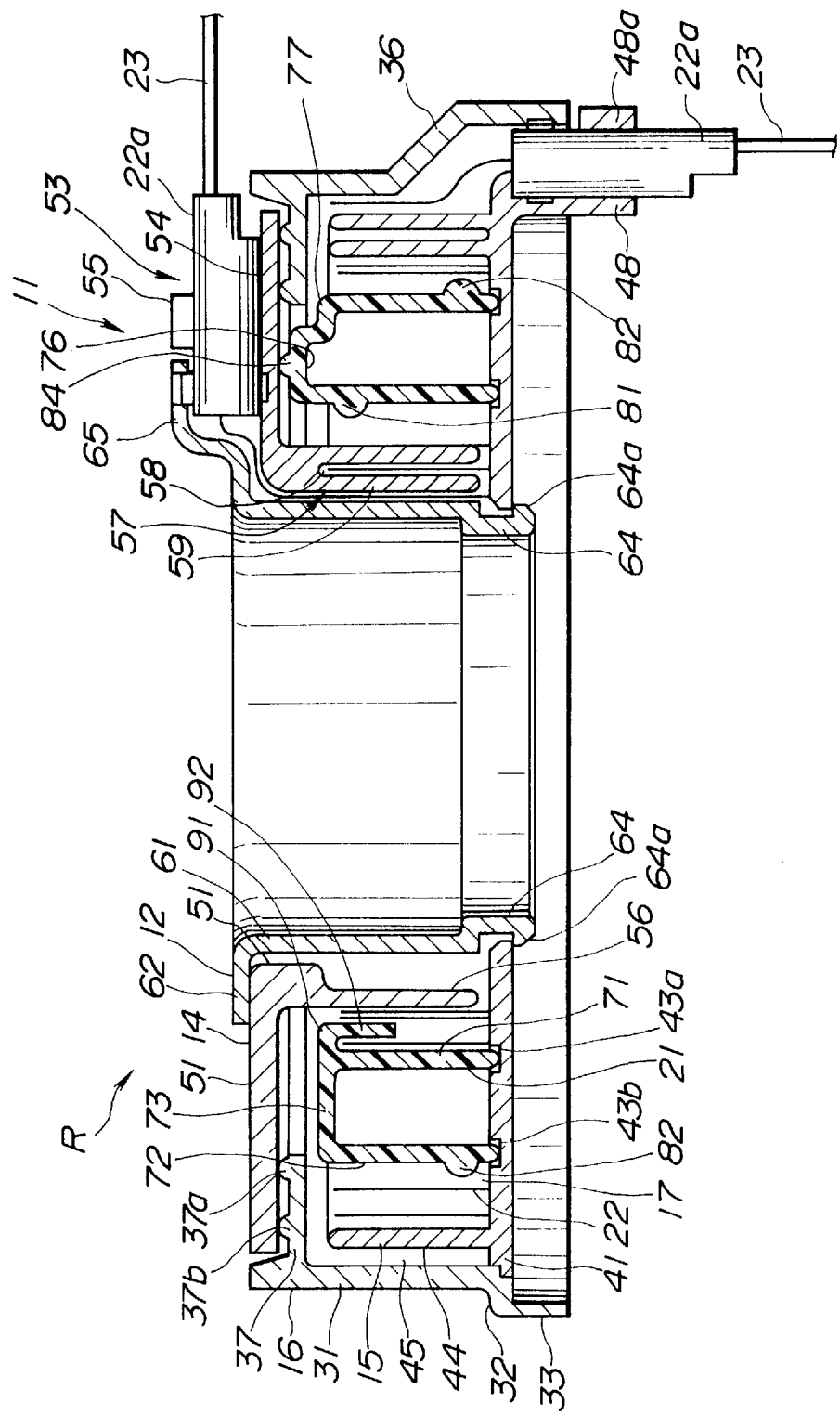
FIG. 23 is a vertical sectional view of a fourth embodiment of the cable reel device according to the present invention.
Figure 25:
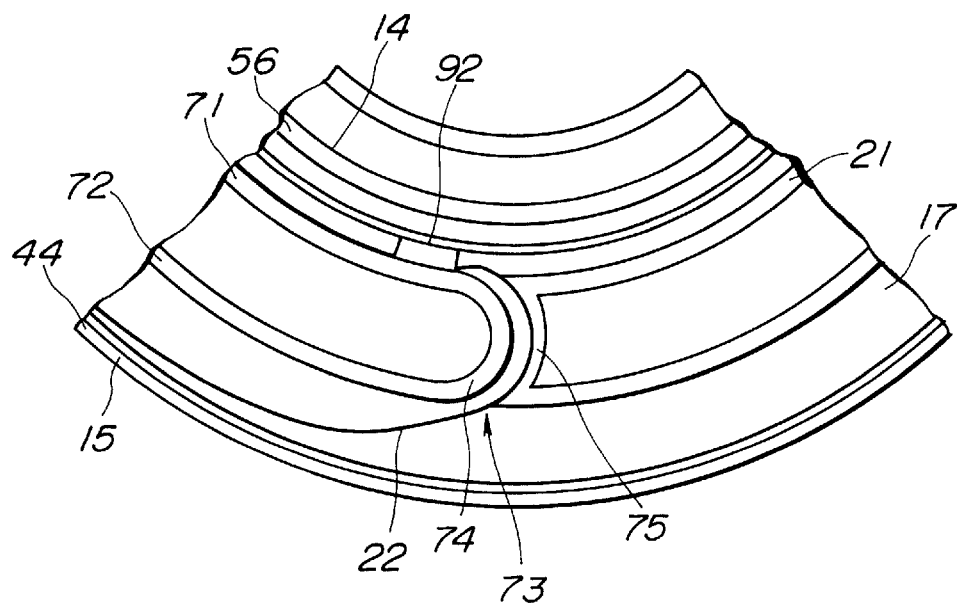
FIG. 25 is a fragmentary transverse sectional view showing the operation of the cable reel device of FIG. 23.

FIGS. 23 to 25 illustrate a fourth embodiment of the cable reel device R of the present invention, similar to the third embodiment cable reel device R. In this embodiment, the inner linear projections 78 are formed at the predetermined intervals and located in such a manner that the adjacent ones are respectively in positions different in level or axial direction. The outer linear projections 79 are also arranged similar to the inner linear projections 78. It will be understood the inner or outer linear projections 78, 79 may be continuously formed in the peripheral direction to be generally annular. Although guide member 21 of this embodiment has been shown as being provided with the connecting section 83A similar to that of the third embodiment, it will be appreciated that the connecting section 83A may be omitted in case the guide member 21 has a sufficient strength without formation of the connecting section 83A. Additionally, a plurality of generally hemispherical projections 84 are formed on the upper surface of the flat projection 76 of the guide member 21 so as to be brought into slidable contact with the bottom surface of the upper plate section 51 of the rotor 14 thereby reducing a frictional resistance therebetween. It will be understood the projections 84 may be omitted as occasion demands.

The guide member 21 of this embodiment is provided with a separating hook-like section 90 including an upper portion 91 which is integral with the upper plate section 73 at a position adjacent the convex surface 74 and extends radially inwardly. A side portion 92 is integral with the radially inward end of the upper portion 91 and extends downwardly to be generally parallel with and face the inner peripheral surface of the inner wall section 71 of the guide member 21 to form a predetermined space therebetween. The side portion 92 is generally arcuate in section to be along the inner peripheral surface of the inner wall section 71, so that the hook-like section 90 is generally L-shaped in section as shown in FIG. 23. The height or axial dimension of the hook-like section 90 (the side portion 92) is about half of the that of the inner wall section 71. The flat cable 22 located along the inner peripheral surface of the inner wall section 71 and adjacent the convex surface 74 is inserted between the inner wall section 71 and the hook-like section 90 as shown in FIG. 23 and 25.

As discussed above, the side portion 92 is formed at the side of the convex surface 74 of the turning-over insertion section 73 and along the inner plate section 71 of the guide member 21, in which the flat cable 22 passing through the turning-over insertion section 73 is inserted in the space between the side portion 92 and the inner wall section 71. As a result, when the flat cable 22 is rewound, the flat cable 22 drawn along the side of the convex surface 74 is guided to be smoothly introduced into the turning-over insertion section 73. Furthermore, by virtue of this side portion 92, in the flat cable 22 located at the inner peripheral side of the guide member 21, the first turn part of the flat cable 22 located at the outermost side and contacting with the inner wall section 71 is separate from the second turn part and other parts inside the second turn part located at the inner side relative to the first turn part. Consequently, even if the flat cable 22 projects outwardly during rewinding of the flat cable 22 on the outer peripheral surface of the guide member 21, the second turn part and other parts behind the second turn part are prevented from being brought into contact with the first turn part, and therefore the first turn part can be prevented from increasing in frictional resistance upon being put between the inner wall section 71 and the second turn part and the parts behind the second turn part. This allows the flat cable 22 to be smoothly drawn through the turning-over insertion section 73 thereby preventing a necessary torque from increasing.

Thus, since the flat cable 22 can be moved to be smoothly introduced into the turning-over insertion section 73, the flat cable 22 can be prevented from projecting to the inner peripheral side and from being buckled during unwinding of the flat cable 22 from the shaft section 56. As a result, the flat cable 22 is prevented from being disordered in winding so as to smoothly move thereby allowing the frame section 44 and the shaft section 56 of the cable reel device make a stable relative rotation. Additionally, it is made possible to use the flat cable 22 which is lower in elasticity, lower in thickness and more flexible, and therefore the radial dimension at the bend portion of the flat cable 22 at the turning-over insertion section 73 is decreased thereby minimizing the radial dimension of the guide member 21 thus to make the cable reel device small-sized.

It will be understood that the flat cable 22 can be smoothly moved without using the sliding sheet or the like, and the guide member 21 is formed of a plastic as a one-piece structure in which the side portion 92 is also formed integral with the guide member 21. Accordingly, the structure and production process of the guide member 21 is simplified thereby lowering the production cost thereof. Since the side portion 92 is formed to have the height dimension which is about half of the height dimension of the inner wall section 71 of the guide member 71, the guide member 21 can be readily fabricated by an injection molding using a metallic mold.

Figure 26:
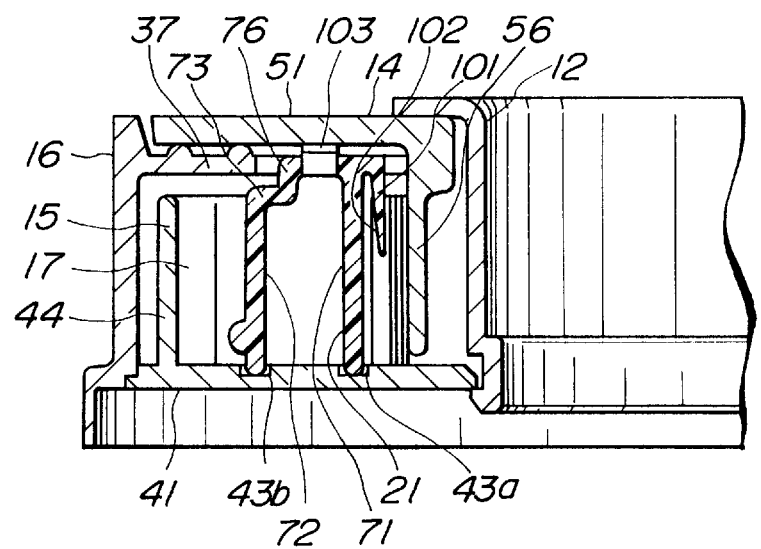
FIG. 26 is a fragmentary vertical sectional view of a modified example of the guide member of the fourth embodiment cable reel device.
Figure 27:
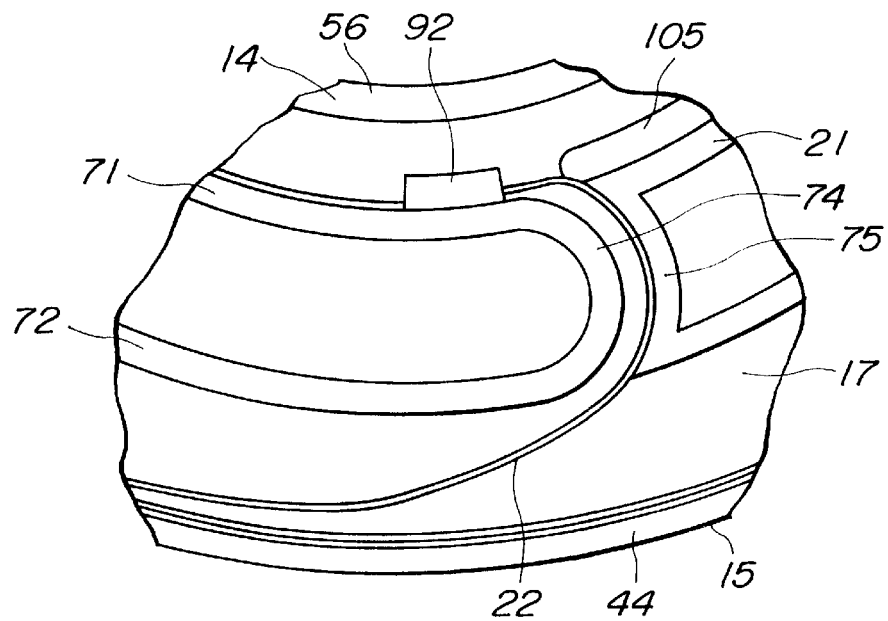
FIG. 27 is an enlarged fragmentary transverse sectional view of another modified example of the guide member of the fourth embodiment cable reel device.

While the side portion 92 of the guide member 21 has been shown and described as being of the plate shape having an arcuate cross-section in the above-mentioned respective embodiment, it will be understood that this side portion 92 may be replaced with a side portion 101 having an outside surface 102 which inclines inwardly and downwardly like the side portion 101 as shown in FIG. 26. By thus inclining the outside surface 102 of the side portion 101, drawing-out of a mold can be readily accomplished during fabrication or molding of the guide member 21, thereby facilitating production of the guide member 21. In the example shown in FIG. 26, an elastic section 103 which is elastically deformable is formed on the flat projection 76 on the guide member 21 in a manner to be integral with or separate from the projection 76, thereby omitting a vertical play of the guide member 21 thus suppressing generation of foreign noises due to vibration. Additionally, as shown in FIG. 27, the guide member 21 is provided at its inner peripheral surface at the concave surface 75 with a linear projection 105 which has an inner peripheral surface which is generally flush with the inner peripheral surface of the side portion 92. As a result, the first turn part of the flat cable 22 located inside the guide member 21 can be smoothly introduced into the turning-over insertion section 73, while the flat cable 22 at the second turn part and behind it can be smoothly moved upon being slidably contacted with the inner peripheral surface of the projection 105 and the inner peripheral surface of the side portion 92.

Figure 28:
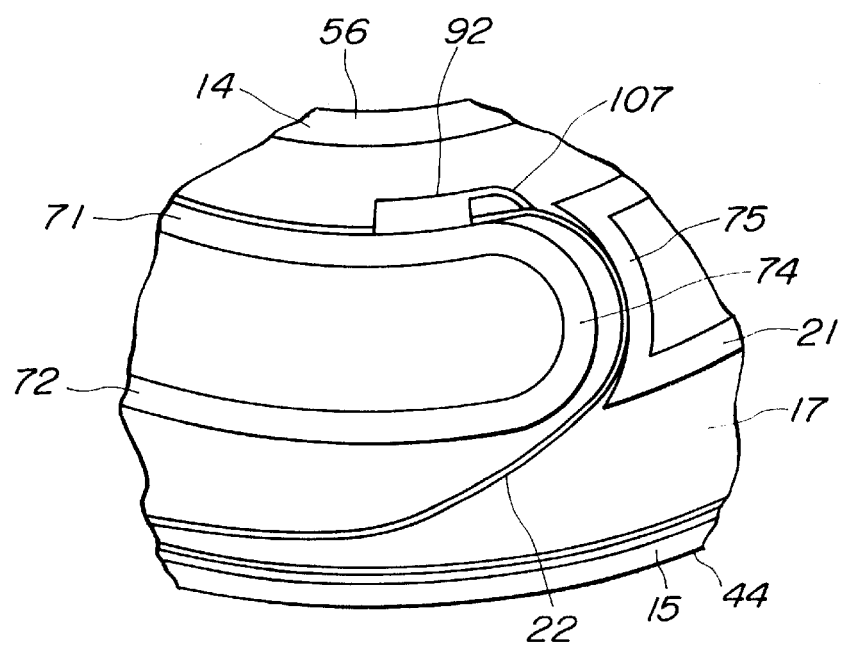
FIG. 28 is an enlarged fragmentary transverse sectional view of a further modified example of the guide member of the fourth embodiment cable reel device.

As shown in FIG. 28, a projecting piece section 107 may be formed projecting from an end portion of the side portion 92 of the guide member 21 and formed curved along the convex surface 74, thereby securely guiding the flat cable 22.

Figure 29:
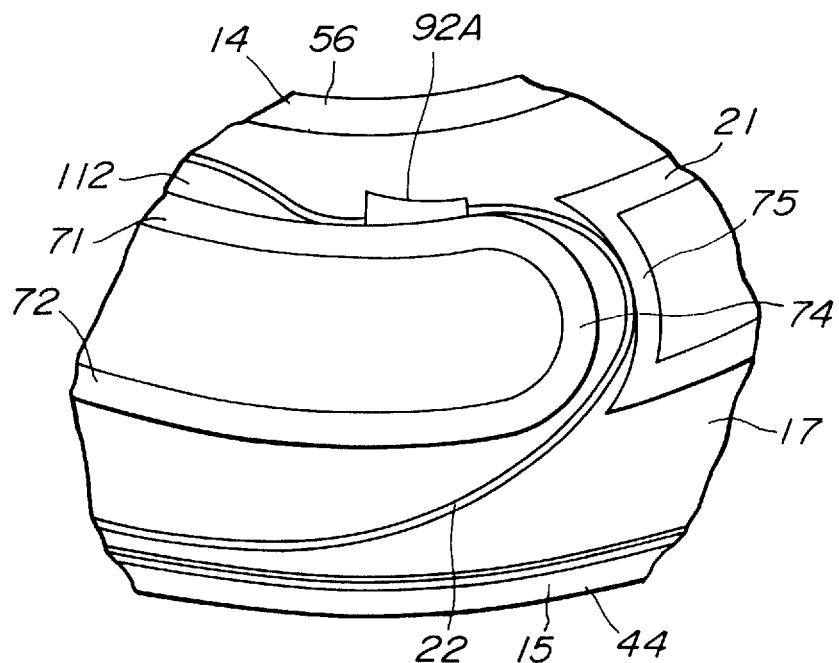
FIG. 29 is an enlarged fragmentary transverse sectional view of a still further modified example of the guide member of the fourth embodiment cable reel device.

Furthermore, as shown in FIG. 29, a linear projection 112 may be formed projecting from the inner peripheral surface of the inner wall section 71 of the guide member 21 and located adjacent the side portion 92A. The end portion of the linear projection 112 at the side of the side portion 92A is gradually inclined toward the inner wall section 71, and the side portion 92A is also gradually inclined to approach the side of the inner wall section 71 in a direction from the side of the projection section 112 to the side of the turning-over insertion section 73, thereby allowing the flat cable 22 to be guided smoothly.

Figure 30:
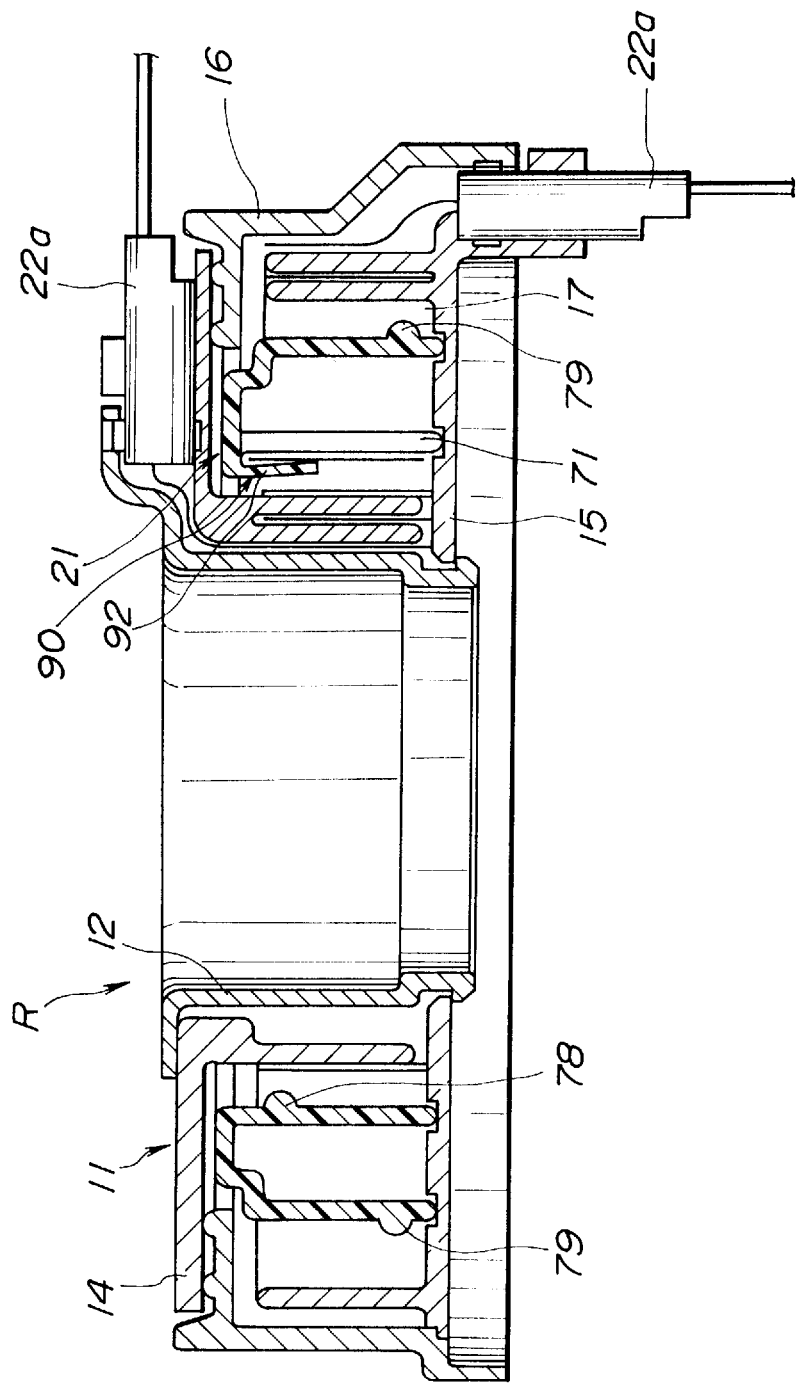
FIG. 30 is a vertical sectional view of the cable reel device including a still further modified example of the guide member of the fourth embodiment cable reel device.

FIG. 30 shows a modified example of the guide member 21 of the fourth embodiment cable reel device R, similar to that of FIGS. 23 and 24. In this example, a part (facing the side portion 92 of the hook-like section 90) of the inner wall section 71 is locally cut out to form an opening extending to the bottom periphery of the inner wall section 71. Such a structure of the guide member 21 is easy to be molded, and a mold to be used is sufficient to be simple in construction while rendering a mold management easy, without any disadvantage in performance of the guide member 21.

Figure 32:
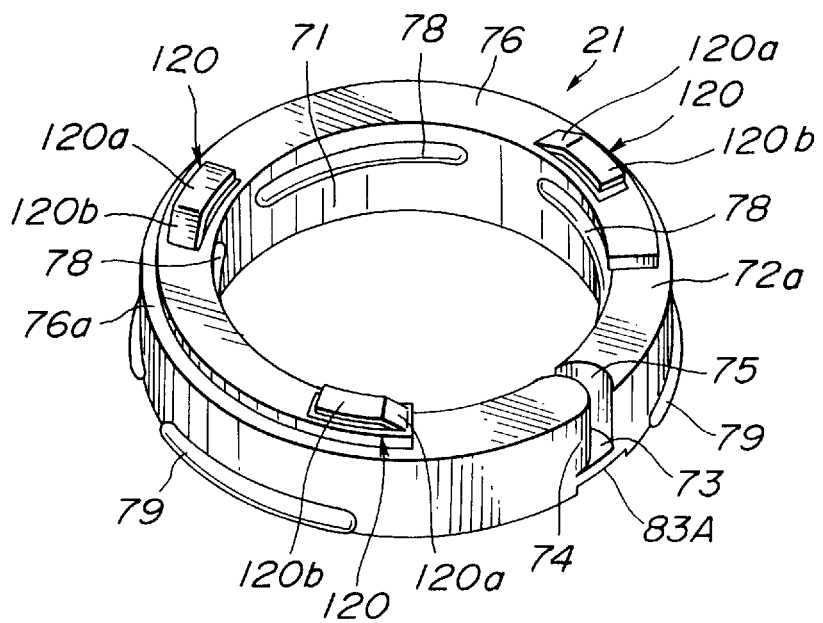
FIG. 32 is a perspective view of a guide member of the cable reel device of FIG. 31.
Figure 31:
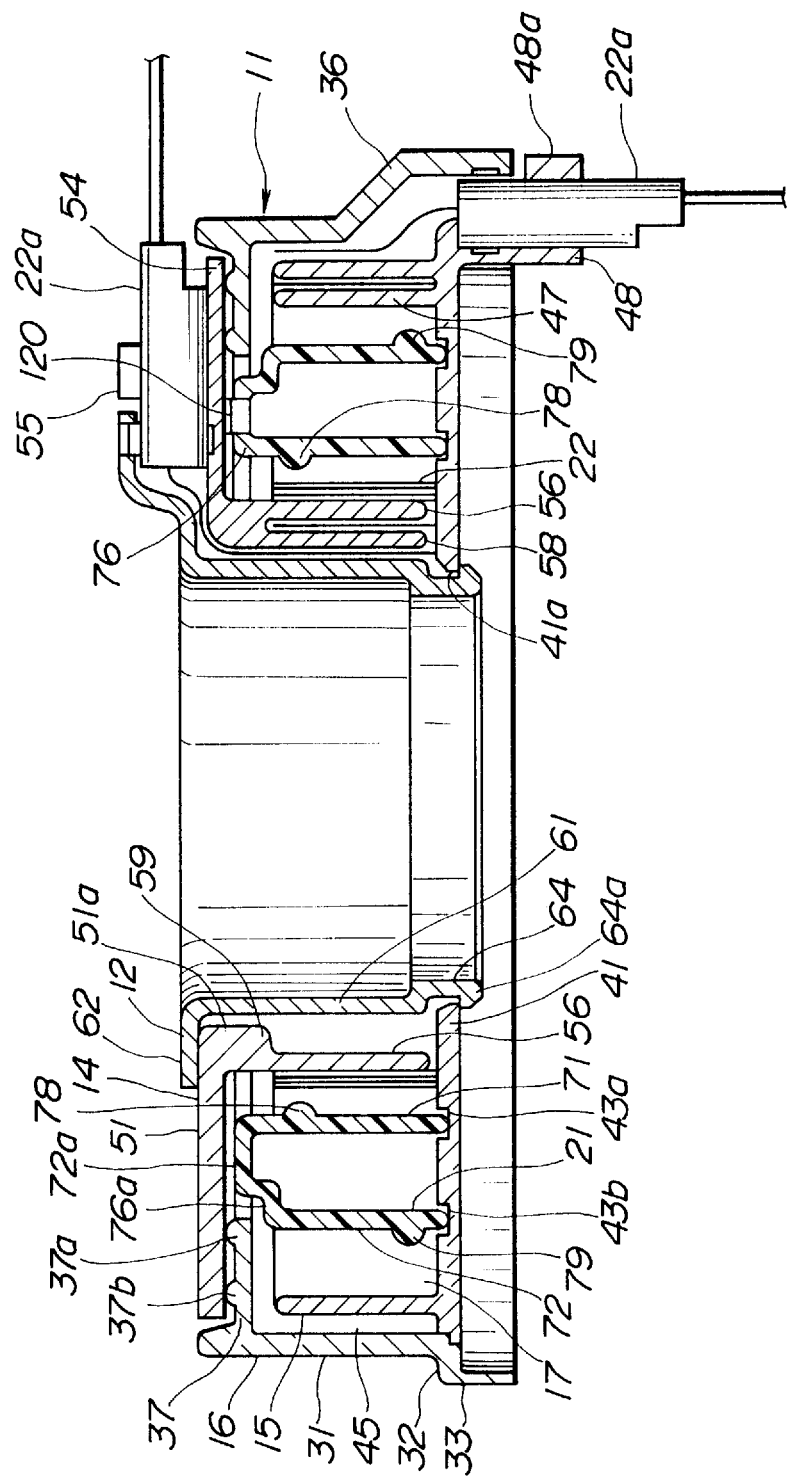
FIG. 31 is a vertical sectional view of a fifth embodiment of the cable reel device according to the present invention.

FIGS. 31 and 32 illustrate an essential part of a fifth embodiment of the cable reel device R according to the present invention, similar to the third embodiment cable reel device R. The guide member 21 of this embodiment is similar to that shown in FIG. 21, and formed with the inner and outer linear projections 78, 79 each of which has a generally semicircular cross-section. The guide member 21 of this embodiment is provided with three elastic piece sections 120 which are formed integral and on the flat projection 76 to project upwardly. Each elastic piece section 120 is elastically deformable and includes an inclined connecting portion 120a which is integrally connected to the flat projection 76 of the guide member 21. A contacting portion 120b is integrally connected at its one end with the connecting portion 120a and arranged generally horizontal, so that the contacting portion 120b faces and is spaced from the upper surface of the flat projection 76. Under a condition in which the guide member 21 has been assembled in the casing 11, the contacting portions 120b of the elastic piece sections 120 are brought into contact with the lower surface of the upper plate section 51 of the rotor 14, or otherwise face the same lower surface of the upper plate section 51 through a slight clearance.

By virtue of the elastically deformable elastic piece sections 120, the guide member 21 and the casing 11 can be prevented from striking against each other thereby suppressing generation of foreign noise even in case that the cable reel device R vibrates in the axial direction of the steering shaft.

Additionally, the elastic piece sections 120 are elastically deformable downwardly, and therefore they 120 can deform when the stator fitting sections 64 of the grapple member 12 are press-fitted to the fitting hole 41a of the lower plate section 41 of the stator 15, so that the engaging claws 64a formed at the tip end portion of the stator fitting sections 64 can be readily passed through the fitting hole 41a to engage with the end edge of the stator lower plate section 41 defining the fitting hole 41a. Accordingly, in a condition that the guide member 21 has been assembled in the casing 11, setting is made in a manner that the contacting portions 120b of the elastic piece sections 120 are brought into contact with the lower surface of the upper plate section 51 of the rotor 14, or otherwise face the same lower surface of the upper plate section 51 through a slight clearance, thus facilitating an assembly operation of the cable reel device R suppressing generation of foreign noise.

While the elastic piece sections 120 have been shown and described as being integrally formed on the upper surface of the guide member 21 in the above embodiment, it will be understood that the elastic piece sections 120 may be formed at the lower surface of the upper plate section 51 of the rotor 14. Otherwise, the elastic piece sections 120 may be formed separate from the guide member 21 or the rotor 14, in which they are formed of a plastic or metal plate spring.

What is claimed is:

1. A reel device for a cable, comprising:

a casing including a generally cylindrical frame section, and a shaft section disposed rotatable in first and second directions relative to said frame section, said first and second directions being opposite to each other; and a cable storing space between said frame section and said shaft section, the cable being stored in said cable storing space and having a first end section connected to said frame section, and a second end section connected to said shaft section, said cable being wound on an outer peripheral surface of said shaft section in a third direction and on an inner peripheral surface of said frame section in a fourth direction with a relative rotation between said frame section and said shaft section, said third and fourth directions being opposite to each other;

a guide member disposed in said cable storing space and located between the cable wound on the outer peripheral surface of said shaft section and the cable wound on the inner peripheral surface of said frame section to guide said cable, said guide member being generally annular and disposed around said shaft section to be rotatable in a peripheral direction of said casing, said guide member including an inner peripheral surface and a slit through which said cable passes and is turned over between said third and fourth directions, said slit including convex and concave surfaces which axially extend and face each other to define said slit therebetween; and smoothening means allowing smoother movement of the cable through said slit and a rotational movement of said guide member, said smoothening means being included in said guide member, said smoothening means including a peripheral projection formed at said inner peripheral surface of said guide member, said peripheral projection being located near the concave surface of said slit and projected beyond an end portion in the peripheral direction of the concave surface to approach the convex surface.

2. A reel device as claimed in claim 1, wherein said frame section is stationary, wherein said shaft section is generally cylindrical and rotatable around the axis of the shaft section and relative to said frame section.

3. A reel device as claimed in claim 2, wherein said frame section, said shaft section and said guide member are arranged coaxial with each other, in which said cable storing space is generally annular.

4. A reel device as claimed in claim 1, wherein said slit in said guide member axially extends to radially communicate inside and outside of said guide member.

5. A reel device as claimed in claim 1, wherein said smoothening means further includes a frictional resistance reducing means between the cable and a surface of said guide member.

6. A reel device as claimed in claim 5, wherein said frictional resistance reducing means includes at least one projection which is located at at least an inner peripheral surface of said guide member, said inner peripheral surface facing said shaft section.

7. A reel device as claimed in claim 6, wherein said projection extends in a peripheral direction of said guide member.

8. A reel device as claimed in claim 6, wherein said peripheral projection forms part of said projection at the inner peripheral surface of said guide member.

9. A reel device as claimed in claim 1, wherein said guide member is formed of a plastic.

10. A reel device as claimed in claim 9, wherein said plastic is polyacetal copolymer.

11. A reel device as claimed in claim 1, wherein said guide member is arranged such that a first apparent radial dimension of said inner peripheral surface of said guide member at a first position adjacent said convex surface is larger than a second apparent radial dimension of said inner peripheral surface of said guide member at a second position adjacent said concave surface.

12. A reel device as claimed in claim 11, wherein said first apparent radial dimension is defined by a part of said inner peripheral surface of said guide member, and said second apparent radial dimension is defined by a projection formed on said inner peripheral surface of said guide member and projecting radially inwardly.

13. A reel device as claimed in claim 1, wherein said casing includes a generally annular plate section fixedly connected to said frame section, said plate section including at least one generally annular groove on said plate section, a part of said guide member is slidably fitted in said annular groove.

14. A reel device as claimed in claim 13, wherein said guide member has two generally annular sections which are coaxial with each other, wherein said annular groove includes two coaxial annular grooves on a surface of said plate section to which an axis of said frame section is perpendicular, the two generally annular sections of said guide member being slidably fitted respectively in said two annular grooves.

15. A reel device as claimed in claim 1, wherein the cable is flat and generally belt-shaped, and includes a plurality of conductor wires, and a plastic film covering said conductor wires, said cable being perpendicular to a plane to which an axis of said guide member is perpendicular.

* * * * *